US007581941B2

(12) United States Patent
Harada et al.

(10) Patent No.: US 7,581,941 B2
(45) Date of Patent: Sep. 1, 2009

(54) PUNCH, AND ROTARY COMPRESSION MOLDING MACHINE USING THE SAME

(75) Inventors: Kenji Harada, Kyoto (JP); Fumiharu Ikai, Shiga (JP); Yuichi Ozeki, Aichi (JP)

(73) Assignees: Kikusui Seisakusho Ltd., Kyoto (JP); Sanwa Kagaku Kenkyusho Co., Ltd., Aichi (JP)

( * ) Notice: Subject to any disclaimer, the term of this patent is extended or adjusted under 35 U.S.C. 154(b) by 248 days.

(21) Appl. No.: 11/660,325

(22) PCT Filed: Aug. 24, 2005

(86) PCT No.: PCT/JP2005/015339

§ 371 (c)(1), (2), (4) Date: Feb. 15, 2007

(87) PCT Pub. No.: WO2006/022290

PCT Pub. Date: Mar. 2, 2006

(65) Prior Publication Data

US 2008/0092706 A1 Apr. 24, 2008

(30) Foreign Application Priority Data

Aug. 26, 2004 (JP) ............................ 2004-246734

(51) Int. Cl.
*B29C 43/08* (2006.01)

(52) U.S. Cl. ..................... 425/345; 425/353; 425/405.1

(58) Field of Classification Search .................. 425/78, 425/344–345, 352–354, 450.1, 451.9
See application file for complete search history.

(56) References Cited

U.S. PATENT DOCUMENTS

| | | | | |
|---|---|---|---|---|
| 7,056,111 | B2 * | 6/2006 | Kitamura et al. | 425/345 |
| 2004/0113319 | A1 | 6/2004 | Kondo et al. | |
| 2004/0131717 | A1 | 7/2004 | Shimada et al. | |

FOREIGN PATENT DOCUMENTS

| | | | |
|---|---|---|---|
| WO | WO 01/98067 | A1 | 12/2001 |
| WO | WO 02/090098 | A1 | 11/2002 |
| WO | WO 03/018302 | A1 | 3/2003 |

OTHER PUBLICATIONS

International Search Report of PCT/JP2005/015339, date of mailing Nov. 29, 2005.

* cited by examiner

*Primary Examiner*—Yogendra Gupta
*Assistant Examiner*—Thu khanh T Nguyen
(74) *Attorney, Agent, or Firm*—Westerman, Hattori, Daniels & Adrian, LLP.

(57) ABSTRACT

This invention provides a punch comprising: a center punch and an outer punch surrounding the outer periphery of the center punch, both of which being slidable and capable of compressing; and relative position restriction means for restricting a relative position of the center and outer punches, the relative position restriction means being configured to restrict a first position in which a punch tip of the center punch is protruded from a punch tip of the outer punch and a second position in which the punch tip of the center punch is substantially coincident with the punch tip of the outer punch, and being configured to fail to restrict a third position in which the punch tip of the center punch is retracted in the punch tip of the outer punch, as well as a rotary compression molding machine provided with the double-structured punch.

19 Claims, 8 Drawing Sheets

FIG. 2
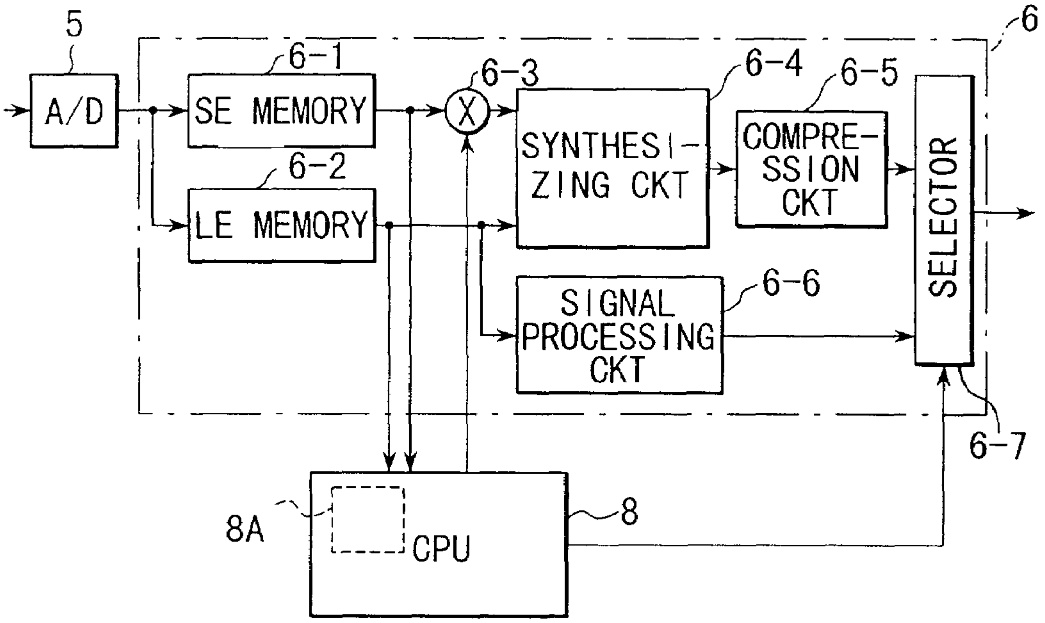
FIG. 3A
FIG. 3B
FIG. 3C
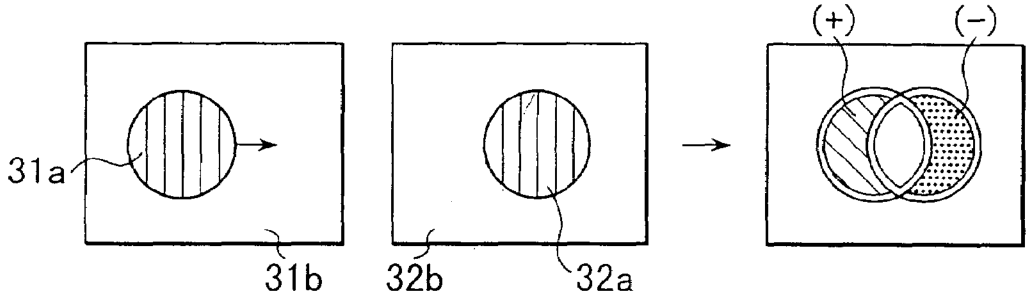
FIG. 3D
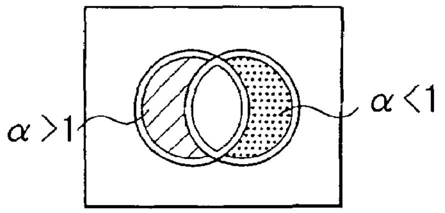
FIG. 4
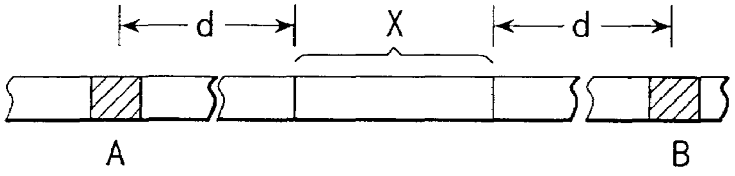

PUNCH, AND ROTARY COMPRESSION MOLDING MACHINE USING THE SAME

TECHNICAL FIELD

The present invention relates to a punch for use in preparing a molding by compression of such a molding material as a powdery/granular material and to a rotary compression molding machine using the same. More specifically, the invention relates to a double-structured punch and to a rotary compression molding machine capable of preparing a molding comprising plural parts, such as a molding with core, by using such a double-structured punch.

BACKGROUND ART

Methods of preparing moldings by compressing and solidifying molding material, representative of which is powdery/granular material, are generally used in a wide range of industry including, for example, not only industrial fields of pharmaceuticals and foods (functional foods and general foods) but also fields of electronic materials such as molding of semiconductor encapsulating resin, battery-related products, powder metallurgy-related products, electronic functional parts and the like, and fields of agricultural chemicals and sanitary products. Among those, in the field of pharmaceuticals, the molding incorporating a core therein is called "a dry coated tablet" since such a molding is prepared by compression-molding molding material to form an outer layer around a core (core tablet).

Conventionally, a molding with core such as a dry coated tablet, is prepared by a method including: previously preparing a core as a molding by means of a separate tablet machine; feeding the core as the molding into a die of a dry coated tablet machine fed and filled with molding material for outer layer; further feeding the molding material for outer layer; and compression-molding the core and molding material for outer layer. This manufacturing method involves serious problems of a larger amount of operation and a lower production efficiency than a method of preparing an ordinary compressed molding. Further, the method of concern involves problems associated with feeding of cores, such as an occurrence of a tablet with no core or multiple cores, displacement of a core in a tablet, and the like and hence requires a complicated mechanism or apparatus for monitoring the feeding of cores and checking final molded products to assure the quality of each molding, thus resulting in the machine increased in size and complicated in structure.

In view of such circumstances, the inventors of the present invention invented a method and apparatus for efficiently preparing a molding with core from such molding material as powdery/granular material at a time, as described in patent document 1. This manufacturing method uses compression molding means having a die and upper and lower punches, at least the upper punch of which, preferably both of which have a double structure comprising a center punch and an outer punch surrounding the outer periphery of the center punch, both of which are slidable and capable of compressing operation. This manufacturing method basically uses double-structured upper and lower punches and includes the steps of feeding and filling respective of molding material for core and molding material for outer layer, the step of compression-molding the molding material for core and/or the molding material for outer layer, and the step of compression-molding the whole molding containing a core. This patent document 1 describes a rotary compression molding machine of the type configured to cause the center punch and the outer punch to perform their respective compressing operations independently for practicing this method. Such a compression molding machine has a complicated compression mechanism. The same holds true for patent document 2 disclosing a compression molding machine configured to prepare the molding of the type different from the type with core.

Further, the inventors of the present invention invented a rotary compression molding machine described in patent document 3 as an apparatus for practicing the aforementioned method of preparing a molding with core. The compression molding machine described in patent document 3 includes a double-structured upper punch having a center punch capable of protruding its head from the head of the outer punch. In a condition where the head of the center punch is most protruded from the head of the outer punch, the center punch and the outer punch come into engagement with each other with their respective punch tips substantially aligned with each other so as to be capable of operating as one piece. Though this type of double-structured upper punch is capable of assuming a position in which the center punch tip and the outer punch tip are substantially aligned with each other and a position in which the center punch tip is protruded from the outer punch tip, this double-structured upper punch is structurally incapable of assuming a position in which the outer punch tip is protruded from the center punch tip.

On the other hand, a double-structured lower punch has a structure in which the center punch head portion is protruded from the outer punch end portion. In a condition where the center punch is most deeply inserted into the outer punch on the opposite side away from the punch tip; stated otherwise, the center punch is most deeply thrust into the outer punch toward the center punch tip side, the center punch and the outer punch come into engagement with each other with their respective punch tips substantially aligned with each other so as to be capable of operating as one piece. Though this type of double-structured lower punch is capable of assuming a position in which the center punch tip and the outer punch tip are substantially aligned with each other and a position in which the outer punch tip is protruded from the center punch tip, this double-structured lower punch is structurally incapable of assuming a position in which the center punch tip is protruded from the outer punch tip. Since the double-structured punch described in patent document 3 is thus configured to operate with its center and outer punches engaged with each other, the rotary compression molding machine has limitation on its punch movements, though its compression mechanism is simplified.

Other double-structured punches include a double-structured punch of the type having a center punch fixed. This type of double-structured punch is used to prepare a molding having a hollow extending through a central portion thereof, for example, a troche used as a medicine or a food and the like. In the case of the double-structured punch having a center punch fixed, a lower punch has a double-structure of a center punch and an outer punch, and an upper punch has a central hollow for receiving the lower center punch in it during compressing. The lower center punch and the hollow of the upper center punch make it possible to prepare a molding having a central hollow. This is the example of the double-structured punch having a center punch fixed, on the other hand, double-structured punches of the type having a freely slidable center punch include, in addition to the double-structured punch described in the aforementioned patent document 1, a double-structured punch of the type having a movable center punch for molding of ceramic, ferrite or the like (non-patent document 1). This double-structured punch is configured such that its center punch and outer punch slide as independently guided by their respective punch rails formed in the compression molding machine. During compression, the center punch and the outer punch are independently pressed by respective compressing sections subjected to pressing operation of the compression molding machine. For this reason, such a double-structured punch is usually not structured to bring the center punch and the outer punch into engagement with each other for compression as in the case of the double-structured punch described in the patent document 3.

Patent Document 1: International Laid-Open Publication No. WO 01/98067 pamphlet

Patent Document 2: International Laid-Open Publication No. WO 03/018302 pamphlet Patent Document 3: International Laid-Open Publication No. WO 02/090098 pamphlet Non-patent Document 3: "PROBLEM ASSOCIATED WITH SHAPING BY CERAMIC POWDER MOLDING AND REMEDY THEREFOR —CHARACTERISTICS OF AND PROBLEMS WITH POWDER CNC MULTI-PLATEN PRESS", Journal of Society of Powder Technology, Japan, p184-194 (2001)

DISCLOSURE OF INVENTION

Problems to be solved by Invention

The inventors of the present invention have become aware of the fact that in the manufacture of moldings with core by the use of a rotary compression molding machine having the double-structured punch described in the aforementioned patent document 3, sampling of a part of specimens is difficult in sampling specimens of respective layers for checking whether or not the weight and thickness of each layer are proper after the step of compression-molding molding material for outer layer and/or molding material for core and before the final compression step. Such a difficulty occurs when, for example, a provisionally molded outer layer which will form a bottom part of an intended molding is thin as a result of compression-molding using a lower punch having a punch tip with a rounded surface, particularly, a rounded surface having a small radius of curvature (deep rounded surface). Since the punch tip of the lower punch has a rounded surface, there are some cases where a provisionally molding on the center punch tip remains at a height lower than the turret surface level even when the punch tips of the center punch and the outer punch are aligned with each other so as to have a continuous rounded surface and the punch tip of the lower punch is raised to the same level as the turret. The reason is that a scraper provided on the turret surface cannot reach the molding in such cases. Such a failure to sample a specimen of each layer will result in a failure to assure the quality of a molding obtained in the molding manufacturing process.

In the case of the double-structured upper punch described in the patent document 3, only the head of the center punch protruding from the head of the outer punch needs to be pressed in a compressing operation performed only by the center punch. In a compressing operation performed with the center and outer punches aligned with each other, only the head of the outer punch needs to be pressed with avoidance of pressing against the head of the center punch. For this reason, the punch head has a larger and more complicated structure than a common punch head. That is, a reduction in the punch size, which is indispensable for a high-speed operation of the rotary compression molding machine, is difficult, which forces the rotary compression molding machine to operate at low speed.

Further, it has been found out that in the manufacture of a molding with core by the rotary compression molding machine using the double-structured punch described in the patent document 3, a molding having low sidewall strength is likely to result under some operating conditions of the rotary compression molding machine. That is, in some cases, the powder density of the outer layer portion forming the sidewall of the molding with core is insufficient, which results in the molding having lowered strength. The present invention has been made in order to solve these problems associated with the manufacturing process and with the molding itself at a time.

Means for Solving the Problems

In order to solve the foregoing various problems, it is required that: the punch for direct compression be limited to either of the center and outer punches with the concept of engagement between the center punch and the outer punch, feature of the double-structured punch described in the patent document 3, retained; and the flexibility of movement of the punch be increased. From these viewpoints, the inventors of the present invention have come up with the idea of variable engagement and then accomplished the present invention. That is, the present invention provides a punch to be described below, as well as a rotary compression molding machine using the same.

The punch according to the present invention comprises: a center punch and an outer punch surrounding the outer periphery of the center punch, both of the center punch and the outer punch being slidable and capable of compressing operation; and relative position restriction means for restricting a relative position of the center punch and the outer punch, the relative position restriction means being configured to restrict a first position in which the punch tip of the center punch is protruded from the punch tip of the outer punch and a second position in which the punch tip of the center punch is substantially coincident with the punch tip of the outer punch, and being configured to fail to restrict a third position in which the punch tip of the center punch is retracted in the punch tip of the outer punch.

In the present invention, the relative position restriction means functions by varying the presence or absence of the engagement of the center and outer punches. Basically, the relative position restriction means is means configured to control and restrict a relative position of the center and outer punches in the punch pressurizing direction thereby variably restricting a range allowing the center punch and the outer punch to move independently. Specifically, the relative position restriction means restricts the positional relation between the punch tip of the center punch and the punch tip of the outer punch to the aforementioned first position when the relative position restriction means is in a certain operating position and to the aforementioned second position when the relative position restriction means is a certain engaging position. The expression "fail to restrict a third position in which the punch tip of the center punch is retracted in the punch tip of the outer punch" means that the third position is not restricted to a specific position; specifically, the punch tip of the center punch can be retracted to a desired position in the punch tip of the outer punch. The positional relation between the punch tips of the respective punches in the third position indicates a condition where the punch tip of the center punch is positioned in the punch tip of the outer punch, stated otherwise, the punch tip of the outer punch is positioned as protruded from the punch tip of the center punch.

Examples of the relative position restriction means include means comprising a first restricting component provided on the center punch and a second restricting component provided on the outer punch; both of the first restricting component and the second restricting component are shaped annular and comprising a projected-depressed portion having a projected portion and a depressed portion, wherein: the first restricting component and the second restricting component are positioned with their respective projected-depressed portion facing each other; at least one of the first restricting component and the second restricting component is rotatable on a punch axis of the center punch; and as a result of its rotation, the projected portion of one of the restricting components and the depressed portion of the other restricting component are positioned to be allowed to come close to each other or the projected portions of both restricting components are positioned to be allowed to come into contact with each other. With the relative position restriction means thus configured, the relative position of the center punch and the outer punch assumes the first position when the projected portion of one of the first restricting component and the second restricting component and the depressed portion of the other restricting component come close to each other, and assumes the second position when the projected portions of the first restricting component and the second restricting component come into contact with each other. When the first and second restricting components are spaced apart from each other, the relative position of the center and outer punches assumes the third position in which the punch tip of the center punch is retracted in the punch tip of the outer punch.

Preferably, the aforementioned restricting components are such that the first restricting component has a structure capable of rotating on the punch axis of the center punch, while the second restricting component has a structure incapable of rotating on the punch axis of the center punch. With respect to the locations of the restricting components, it is preferable that the first restricting component is located adjacent to a head portion of the center punch on an opposite side away from the punch tip of the center punch, while the second restricting component is located adjacent to an end portion of the outer punch on an opposite side away from the punch tip of the outer punch. Examples of means for controlling rotation of such a restricting component include rotation control means which controls rotation of the rotatable one of the first restricting component and the second restricting component by being guided by external rotation drive means is attached to the rotatable one of the restricting components. The rotation control means can take any form without particular limitation, and examples of such forms include a plate component shaped like a bell in a plane view.

Meanwhile the rotary compression molding machine according to the present invention is a rotary compression molding machine using the above-described punch having the double-punch structure. That is, the rotary compression molding machine comprising: a turret being rotatably mounted in a frame; dies each having a die bore mounted in the turret at a predetermined pitch; an upper punch and a lower punch vertically slidably held above and below each of the dies, the upper punch and the lower punch comprising a center punch and an outer punch surrounding the outer periphery of the center punch, both of which being slidable and capable of compressing operation; a plurality of molding material feeding and filling sections each configured to feed molding material into the die or a space defined above the lower center punch and surrounded by the lower outer punch; pre-compression means configured to press the upper center punch and the lower center punch for compression-molding the molding material fed and filled in the space defined above the lower center punch and surrounded by the lower outer punch; and main compression means configured to press the upper punch and the lower punch for compression-molding the whole molding including the molding material fed and filled by a last molding material feeding and filling section, the compression molding machine characterized in that: at least the upper punch has relative position restriction means for restricting a relative position of the center punch and the outer punch, the relative position restriction means being configured to restrict a first position in which the punch tip of the center punch is protruded from the punch tip of the outer punch and a second position in which the punch tip of the center punch is substantially coincident with the punch tip of the outer punch, and being configured to fail to restrict a third position in which the punch tip of the center punch is retracted in the punch tip of the outer punch. In the rotary compression molding machine according to the present invention, it is preferable that the lower punch has relative position restriction means similar to that of the upper punch.

Here, the parts related to the punch including the relative position restriction means and the restricting components are each the same as described earlier. The rotary compression molding machine according to the present invention is provided therein with rotation drive means configured to guide rotation control means configured to control rotation of a rotatable one of the restricting components. If the rotation control means comprises a plate component shaped like a bell in a plane view, the rotation drive means is configured to control the rotation of the rotation control means by varying the width of a rail by which the rotation drive means guide the rotation control means and the distance between an inner wall surface of the rail and a horizontal trajectory of a central axis of the punch.

In an embodiment of the rotary compression molding machine according to the present invention, for example, it is possible that: the relative position of the lower center punch and the lower outer punch assumes the first position in the last molding material feeding and filling section after compression of the molding material by the pre-compression means, and then assumes the second position during the main compression of the whole molding including the molding material fed and filled. Specifically, in the embodiment wherein the relative position restriction means comprises the first and second restricting components as described above, the projected portion of one of the restricting component is brought close to the depressed portion of the other restricting component in the last molding material feeding and filling section to cause the relative position of the lower center punch and the lower outer punch to assume the first position. Further, in order to achieve the main compression of the whole molding including the molding material fed and filled, the projected portions of respective of the two restricting components are brought into contact with each other to cause the relative position of the lower center punch and the lower outer punch to assume the second position.

In another embodiment, the rotary compression molding machine may further comprise additional pre-compression means configured to compress the molding material while the relative position of the lower center punch and the lower outer punch shifts from the first position to the second position. That is, the additional pre-compression means is provided for compressing the molding material during the transition from the condition in which the projected portion of one of the restricting components is close to the depressed portion of the other restricting component to the condition in which the projected portions of respective of the two restricting components come into contact with each other.

In an embodiment of the rotary compression molding machine according to the present invention, it is possible that: the molding material feeding and filling sections consist of a first molding material feeding and filling section for feeding first molding material, and a second molding material feeding and filling section for feeding second molding material; and the pre-compression means is configured to compress the first molding material. This embodiment may further comprise means configured to pre-compress the second molding material by the upper center punch and the upper outer punch.

In an embodiment of the rotary compression molding machine according to the present invention, it is possible that: the molding material feeding and filling sections consist of a first molding material feeding and filling section for feeding first molding material, a second molding material feeding and filling section for feeding second molding material, and a third molding material feeding and filling section for feeding third molding material, and wherein the pre-compression means consist of first pre-compression means for compressing the first molding material and second pre-compression means for compressing the second molding material.

Advantage of Invention

The punch according to the present invention, particularly when used as an upper punch, need not have a complicated punch head structure as required by the conventional punch and hence can be wholly reduced in size. For this reason, when used in a rotary compression molding machine, the punch of the present invention allows the rotary compression molding machine to operate at a high speed. Moreover, the punch of the present invention is capable of compressing operation with its center and outer punches engaged with each other. For this reason, the compression means of the rotary compression molding machine need not have a complicated structure.

Since there is a lot of flexibility of punch movement, the punch of the present invention offers various advantages to a rotary compression molding machine using this punch as a lower punch. First, a provisional molding obtained halfway through the molding process, that is, the provisional molding that is on the lower punch and positioned lower than the turret surface can be sampled as a specimen, which makes it possible to assure the quality of the molding in the manufacturing process. Also, in the manufacture of a molding with core in particular, the step of feeding and filling the last molding material for outer layer is performed with the lower center punch protruded from the lower outer punch, whereby the packing density of the molding material for outer layer forming the sidewall of the molding can be increased. For this reason, the molding can be imparted with a higher strength. Further, in the case where the step of feeding and filling the last molding material for outer layer is performed with the lower center punch protruded from the lower outer punch as described above, it is possible to eliminate the step of feeding and filling the molding material for outer layer that is performed prior to the core molding material feeding and filling step, so that makes it possible to manufacture a molding with core by two molding material feeding and filling steps.

BEST MODE FOR CARRYING OUT THE INVENTION

Hereinafter, a double-structured punch and a rotary compression molding machine as well as a process for preparing a molding with core or the like by using them according to one embodiment of the present invention will be described with reference to FIGS. 1 to 16. The term "molding material", as used in the present DESCRIPTION, is meant to include all moldable materials including both wet and dry powdery/granular materials. The term "powdery/granular material" is used to represent powder, granule and any material analogous thereto. The molding material used in the present invention is preferably a powdery/granular material.

First, description will be made of a rotary compression molding machine adapted to compression-molding a molding with core as one embodiment of the rotary compression molding machine according to the present invention. The rotary compression molding machine according to this embodiment has upper punch 5 and lower punch 6 each comprising a double-structured punch according to the present invention to be described later.

Figure 1:
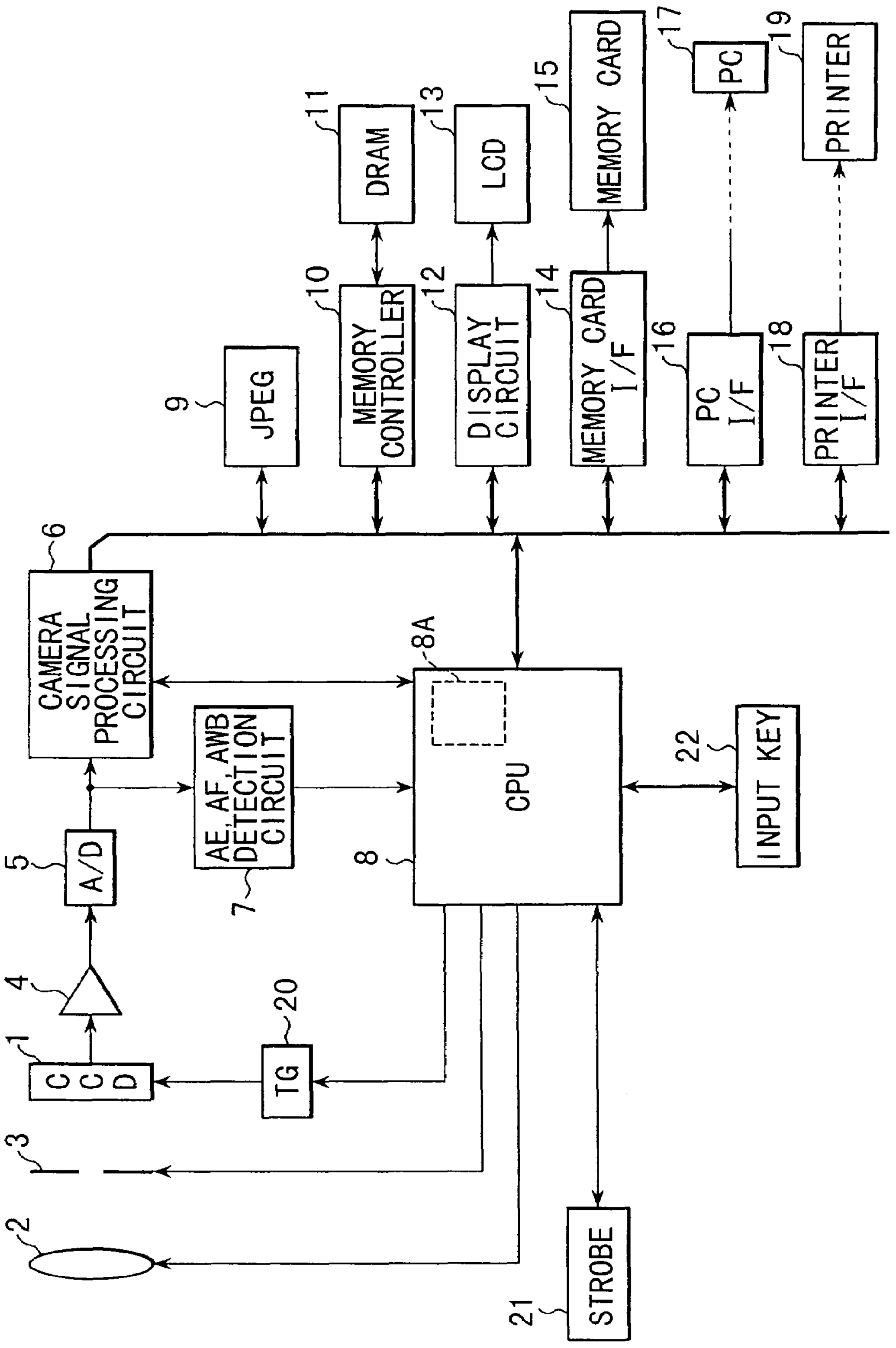
FIG. 1 is a sectional view showing one embodiment of a rotary compression molding machine according to the present invention.
Figure 5A:
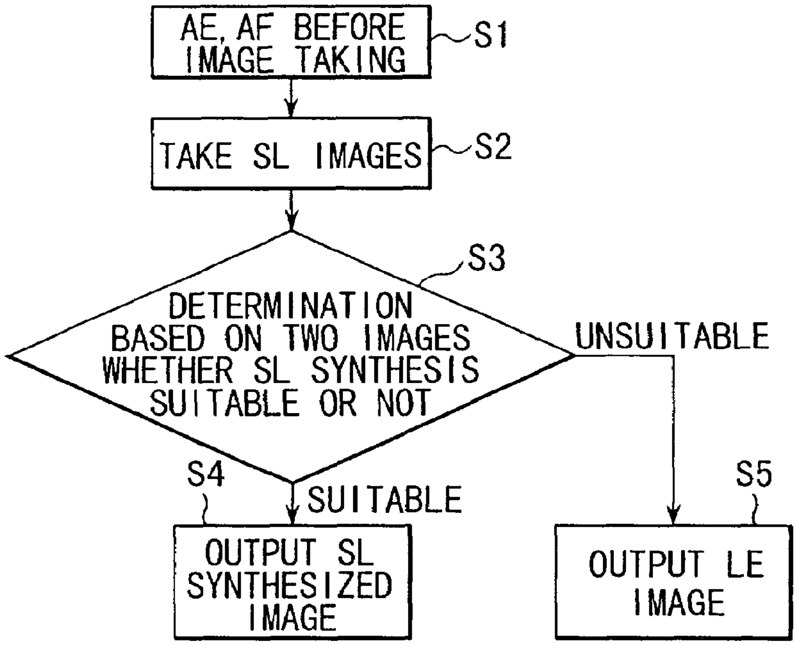
FIG. 5 is an enlarged sectional view showing a portion of concern of the same embodiment for illustrating the upper and lower punches in a condition (a) assumed during first molding material feeding and filling and in a condition (b) assumed during first pre-compression.
Figure 5B:
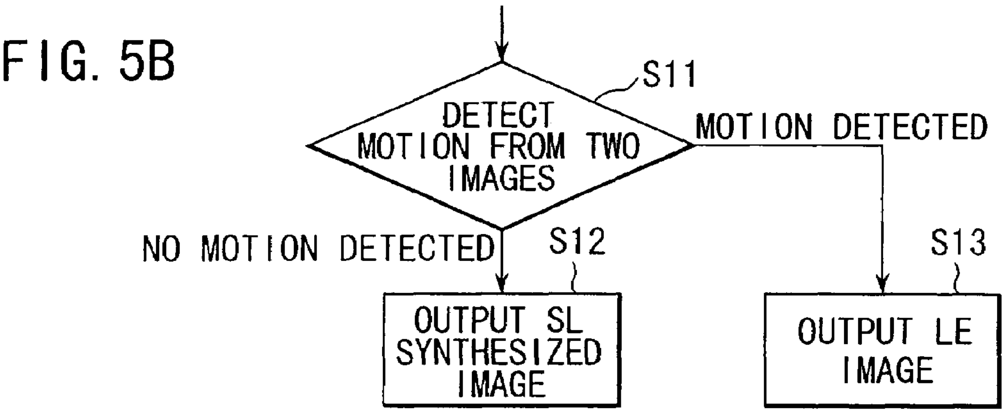
Figure 5C:
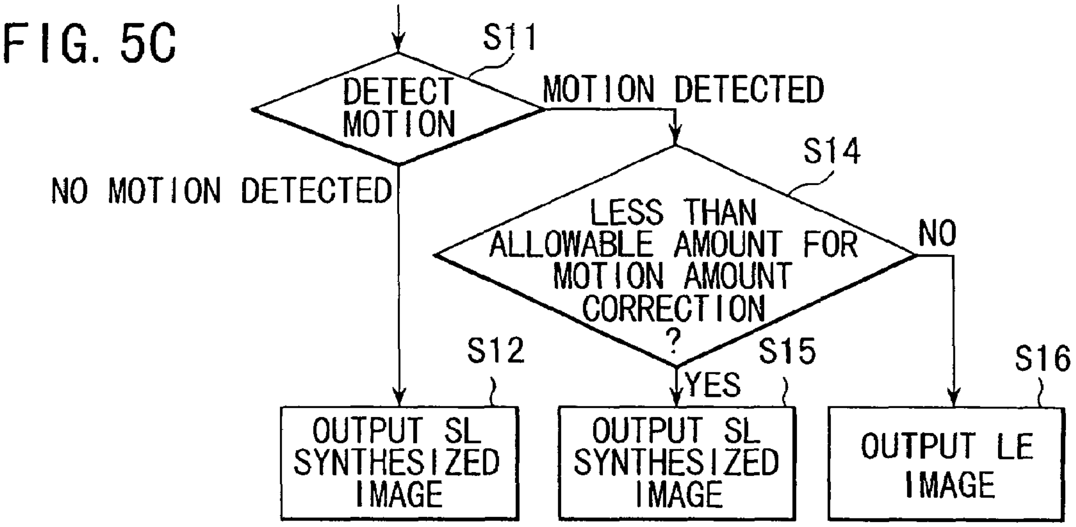
Figure 6:
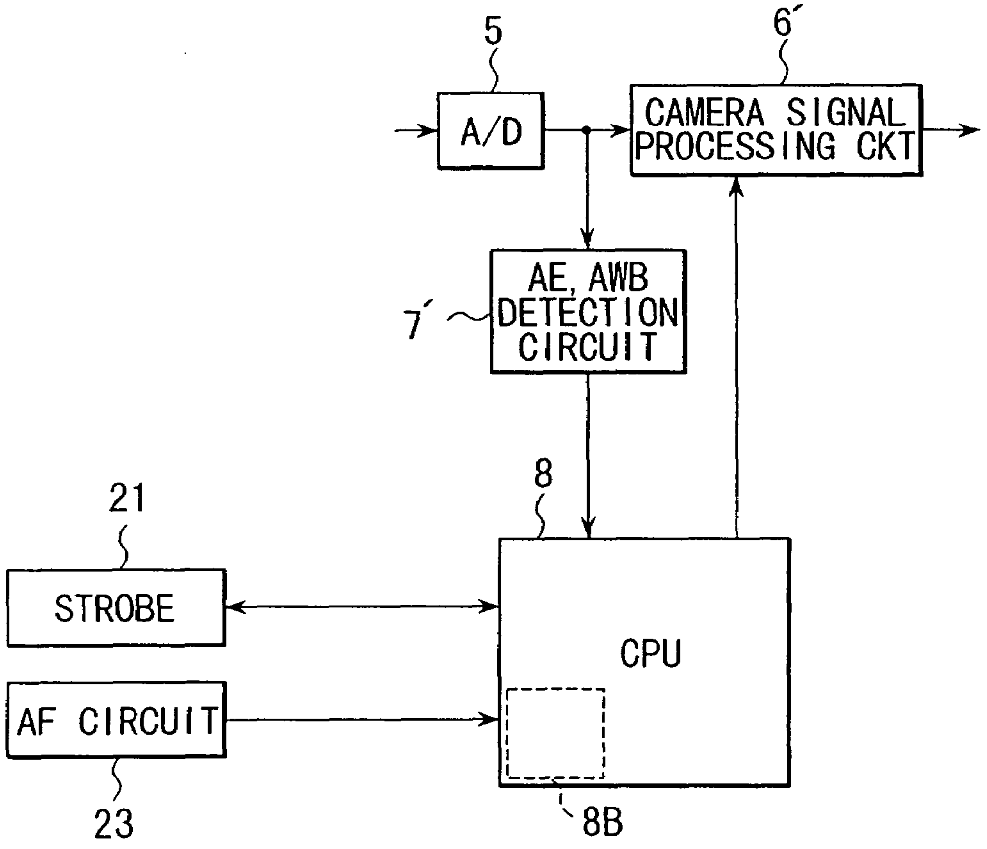
FIG. 6 is an enlarged sectional view showing a portion of concern of the same embodiment for illustrating the upper and lower punches in a condition (a) assumed during second molding material feeding and filling and in a condition (b) assumed during second pre-compression.
Figure 2:
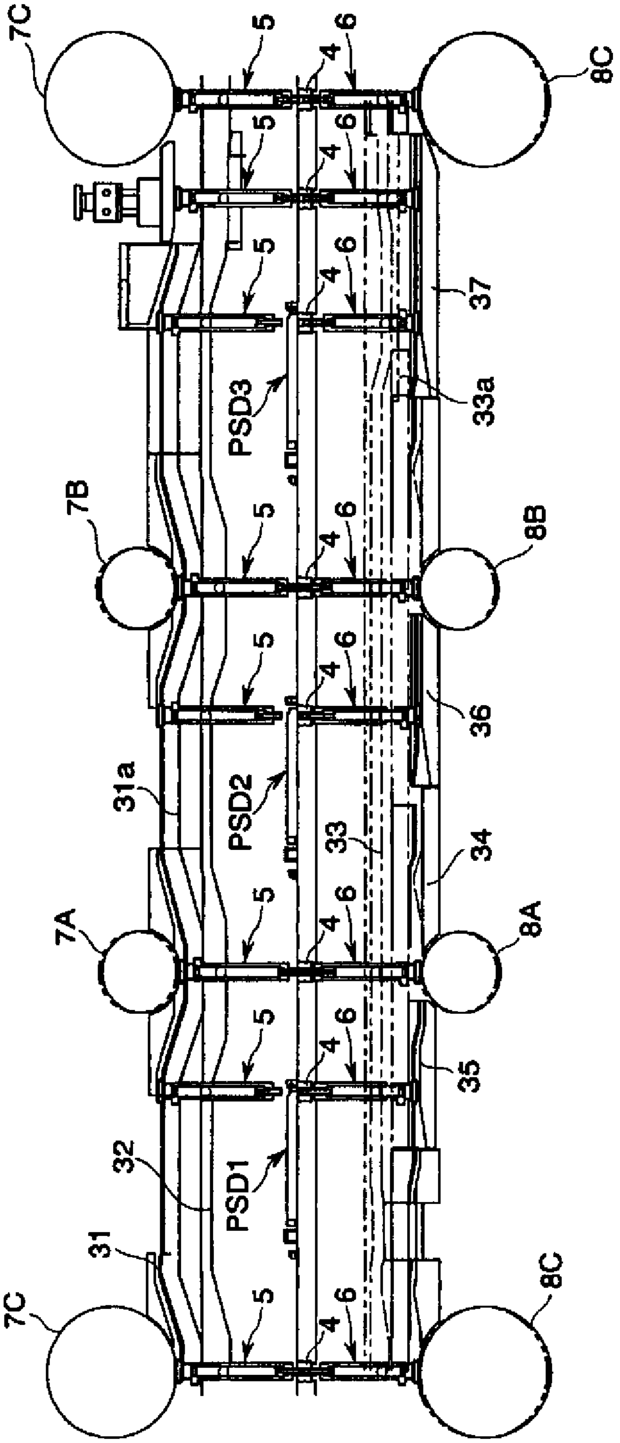
FIG. 2 is a development showing one embodiment of a rotary compression molding machine according to the present invention for illustrating the flow of manufacturing process of a molding with core and the movement of a punch relative to a turret operating.

As shown in FIG. 1, the rotary compression molding machine includes a turret 3 mounted in a frame 1 via a vertical shaft 2 for horizontal rotation, a plurality of dies 4, each of which has a die bore 4*a*, arranged circumferentially of the turret 3 at a predetermined pitch, and the upper punch 5 and lower punch 6 vertically slidably held above and below each die 4. Upper compression rolls 7A, 7B and 7C and lower compression rolls 8A, 8B and 8C positioned above and below the turret 3 are arranged centering around the vertical shaft 2 so that molding material fed and filled in each die bore 4*a* or in a lower outer punch 62 positioned within the die bore 4*a* can be compression-molded as the upper and lower punches 5 and 6 with their respective tip ends, i.e. punch tips in a position inserted in the die bore 4*a* pass through between the pair of upper and lower first pre-compression rolls 7A and 8A, between the pair of upper and lower second pre-compression rolls 7B and 8B and between the pair of upper and lower main compression rolls 7C and 8C sequentially in this order as shown in FIG. 2.

Molding material feeding and filling mechanism includes first, second and third molding material feeding and filling sections PSD1, PSD2 and PSD3 (FIG. 2), each comprising a combination of a hopper for storing associated molding material and a molding material feeding and filling device such as an open feeder or a agitating die feeder, for feeding the molding material supplied from the hopper into the die bore 4*a*. As shown in FIG. 2, the first molding material feeding and filling section PSD1 is disposed at a location where the die 4 is positioned before reaching the location of the pair of upper and lower first pre-compression rolls 7A and 8A. Similarly, the second molding material feeding and filling section PSD2 is disposed at a location where the die 4 is positioned before reaching the location of the pair of upper and lower second pre-compression rolls 7B and 8B, and the third molding material feeding and filling section PSD3 is disposed at a location where the die 4 is positioned before reaching the location of the pair of upper and lower main compression rolls 7C and 8C. It should be noted that since each of the first, second and third molding material feeding and filling sections PSD1, PSD2 and PSD3 can employ any molding material feeding and filling device widely known in this field, only the locations thereof are shown in FIG. 2.

The vertical shaft 2 rotates by rotation of a worm wheel 22 fixed adjacent the lower end of the vertical shaft 2 as shown in FIG. 1. Driving power of a main motor 25 is transmitted to a worm wheel 22 meshing with the worm 23 through a V-belt 24.

Upper center punch guide rail 31 and upper outer punch guide rail 32 are each located adjacent the upper end of the vertical shaft 2 for guiding sliding of a respective one of upper center punch 51 and upper outer punch 52 in the frame 1. The upper center punch guide rail 31 and upper outer punch guide rail 32 guide the upper center punch 51 and the upper outer punch 52 to their respective highest positions at a location near the place where the molding material is fed and filled and to their respective low positions just below each of the upper rolls 7A, 7B and 7C at a location of the place reaching each of the upper rolls 7A, 7B and 7C.

On the other side, lower center punch guide rail 34 and lower outer punch guide rail 33 are each mounted below the turret 3 for guiding sliding of a respective one of lower center punch 61 and lower outer punch 62. The lower center punch guide rail 34 and lower outer punch guide rail 33 guide the lower center punch 61 and the lower outer punch 62 upwardly and downwardly during their passage through first, second and third quantity adjusting rails 35, 36 and 37. Specifically, the lower center punch 61 vertically moves independently of the lower outer punch 62 until the punch has passed through between each of the pairs of rolls 7A and 8A, 7B and 8B, and 7C and 8C shown in FIG. 2 as its head 61*b* slides on the lower center punch guide rail 34. In this way, the lower center punch 61 is guided to each of the first, second and third quantity adjusting rails 35, 36 and 37. Unlike the first, second and third quantity adjusting rails 35, 36 and 37, the lower center punch guide rail 34 guides the lower center punch 61 at a substantially constant height level until removal of the compressed molding from the die 4.

Further, restricting component guide rails 31*a* and 33*a* are formed integrally under the upper center punch guide rail 31 and over the lower center punch guide rail 34, respectively, for rotation control over first restricting component 51*c* provided on the upper center punch 51 and first restricting component 61*c* provided on the lower center punch 61, respectively.

The rotary compression molding machine thus constructed prepares a molding with core by means of the upper and lower punches 5 and 6 passing the first molding material feeding and filling section PSD1, the pair of upper and lower first pre-compression rolls 7A and 8A, the second molding material feeding and filling section PSD2, the pair of second pre-compression rolls 7B and 8B, the third molding material feeding and filling section PSD3 and the pair of main compression rolls 7C and 8C in this order with rotation of the turret 3, as shown in FIG. 2. In this embodiment, first molding material PD1 and third molding material PD3 are the same, and second molding material PD2 which will form a core is different from those molding material PD1 and PD3. While each of the compression rolls used in the present embodiment is a disk-shaped roll for pressurizing the punch, any compression means may be used as long as it is capable of compressing operation. For example, it is possible to use any one of common compression means other than that relied upon rolls for compression achieved directly by a rail, compression means for compression achieved by a series of small rolls, and like compression means. Though the pre-compression and the main compression may be different from each other in the manner of compression, the main compression preferably uses rolls in order to make high-pressure compression possible.

Figure 3:
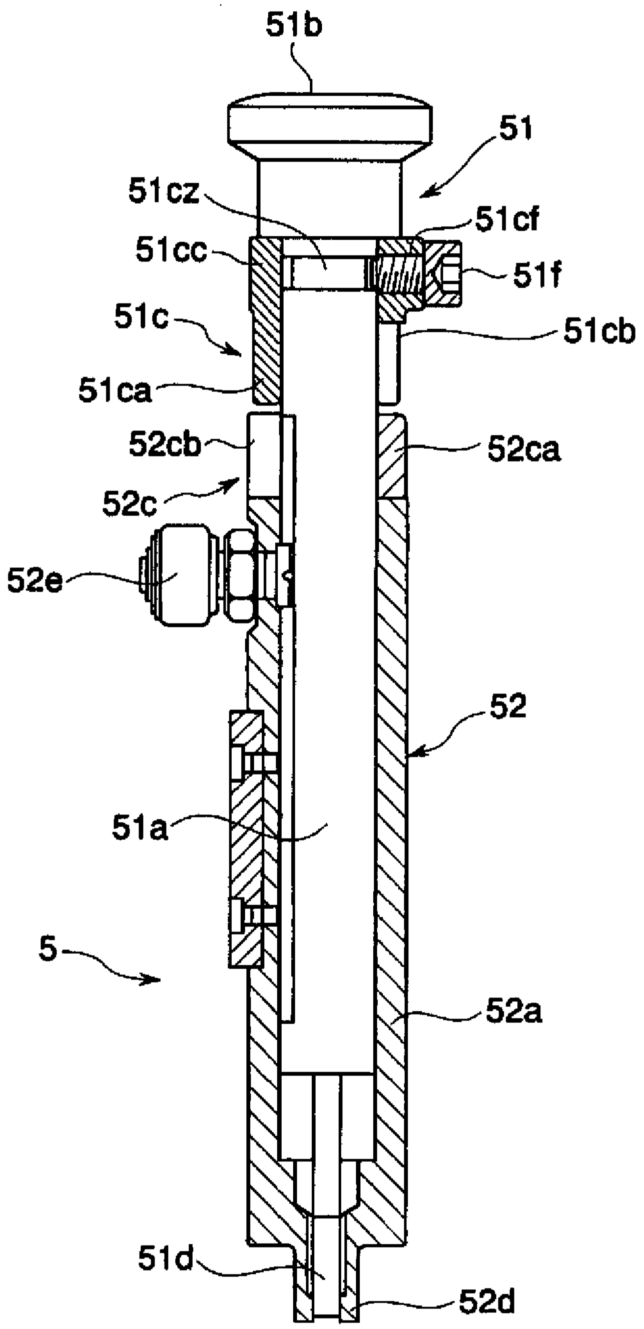
FIG. 3 is a sectional view showing an upper punch used in the same embodiment.

While the embodiment shown in FIG. 3 has three pairs of compression rolls, namely, the upper and lower first pre-compression rolls 7A and 8A, the upper and lower second pre-compression rolls 7B and 8B, and the upper and lower main compression rolls 7C and 8C, an additional compressing section may be provided when necessary. Examples of such arrangements include an arrangement wherein pre-compression means for compressing molding material during transition of the relative position of the lower center punch 61 and the lower outer punch 62 from the first position to the second position is provided at a location past the last molding material feeding and filling section PSD3 and/or before the pair of main compression rolls 7C and 8C.

In order to increase the packing density of the outer layer molding material forming the sidewall of the molding with core thereby to enhance the strength of the molding, the aforementioned pre-compression during the transition of the relative position of the lower center punch 61 and the lower outer punch 62 from the first position to the second position is preferably performed continuously during a phase in which the lower outer punch 62 is raised to align lower outer punch tip 62*d* with lower center punch tip 61*d*. That is, the molding and the molding material on the lower punch 6 are continuously pressurized by the upper punch 5, while the lower outer punch 62 is raised toward the lower center punch tip 61*d*. Though not preferable, temporary or intermittent pressurization without continuous pressurization is possible.

One embodiment of the double-structured punch according to the present invention will be described in detail with reference to FIGS. 3 to 13 mainly. Since the double-structured punch of the present invention is used for both the upper punch 5 and the lower punch 6 in the present embodiment, description will be made mainly of the structure of the upper punch 5 shown in these FIGURES.

Figure 15:
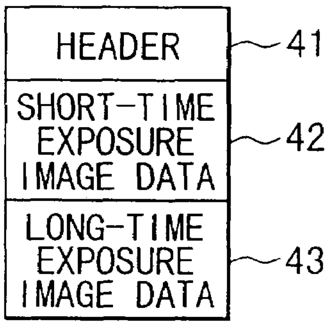
FIG. 15 is a perspective view showing one embodiment of a punch (corresponding to FIG. 3) according to the present invention, particularly, a portion forming relative position restriction means.

As shown in FIG. 3, the upper punch 5 comprises, at least, upper center punch 51, upper outer punch 52 circumscribing the upper center punch 51, and a pair of restricting components, i.e., first and second restricting components 51*c* and 52*c*, forming the relative position restriction means (the outward appearance of which is shown in FIG. 15). The upper center punch 51 is slidably held in the upper outer punch 52 and is capable of pressing. The upper center punch 51 comprises a trunk portion 51*a*, a head portion 51*b* formed at the upper end of the trunk portion 51*a*, first restricting component 51*c* attached below the head portion 51*b* which forms part of the relative position restriction means, and punch tip 51*d* extending from the lower end of the trunk portion 51*a*. The punch tip 51*d* has an outer diameter corresponding to the diameter of a molding to be incorporated in an intended molding, for example, the diameter of a core to be incorporated in a molding with core. The head portion 51*b*, which usually has a larger outer diameter than the trunk portion 51*a*, is configured to slide as guided by the upper center punch guide rail 31.

On the other hand, an explanation about the upper outer punch 52 is made. The upper outer punch 52 circumscribing the upper center punch 51 is cylindrically shaped and comprises a trunk portion 52*a* housing the trunk portion 51*a* of the upper center punch 51, second restricting component 52*c* attached to the upper end of the trunk portion 52*a* which forms part of the relative position restriction means, and punch tip 52*d* circumscribing the punch tip 51*d* of the upper center punch 51. A guide roller 52*e* attached adjacent the upper end of the trunk portion 52*a* slides on the upper outer punch guide rail 32. The punch tip 52*d* has an outer diameter substantially equal to the inner diameter of the die bore 4*a*.

Figure 4:
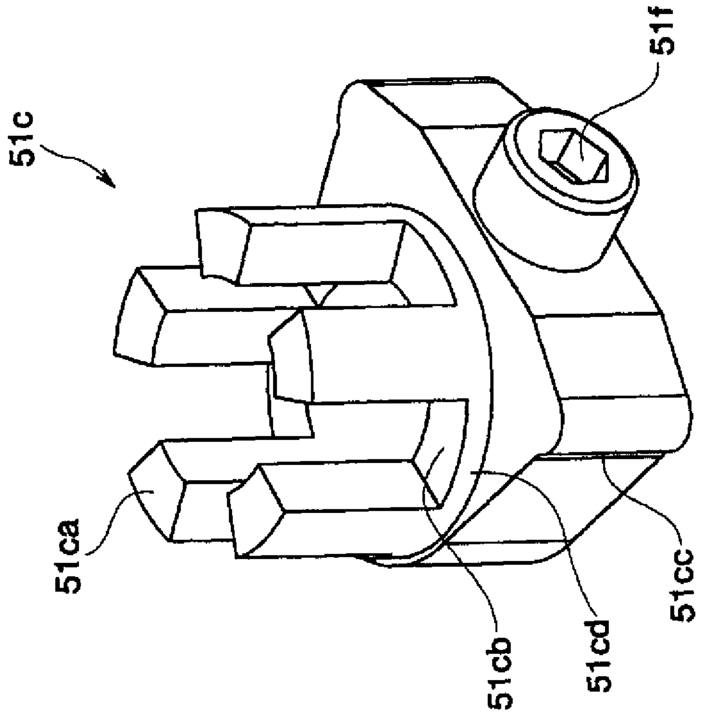
FIG. 4 is a perspective view showing a first restricting component used in the same embodiment.
Figure 5:
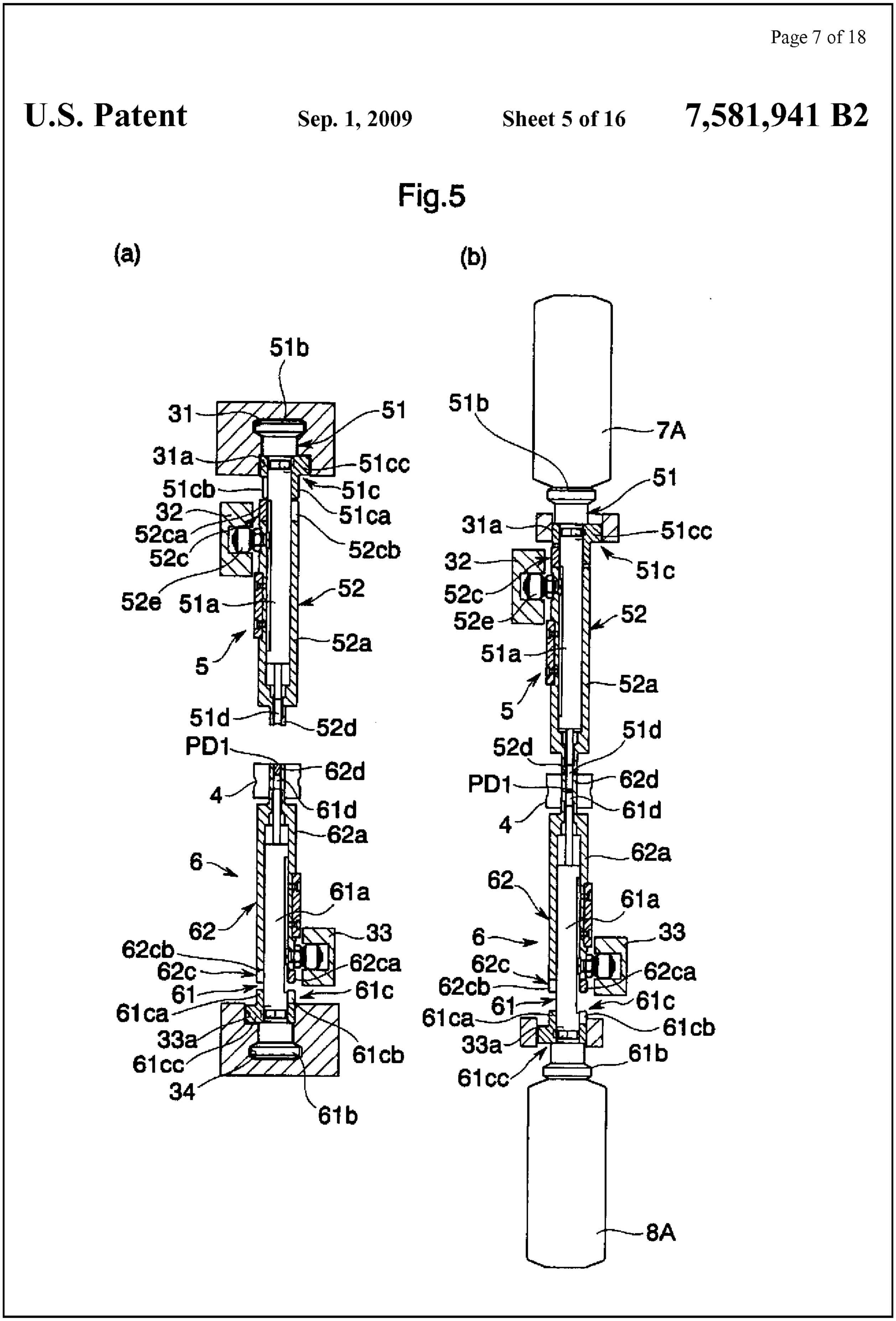
Figure 6:
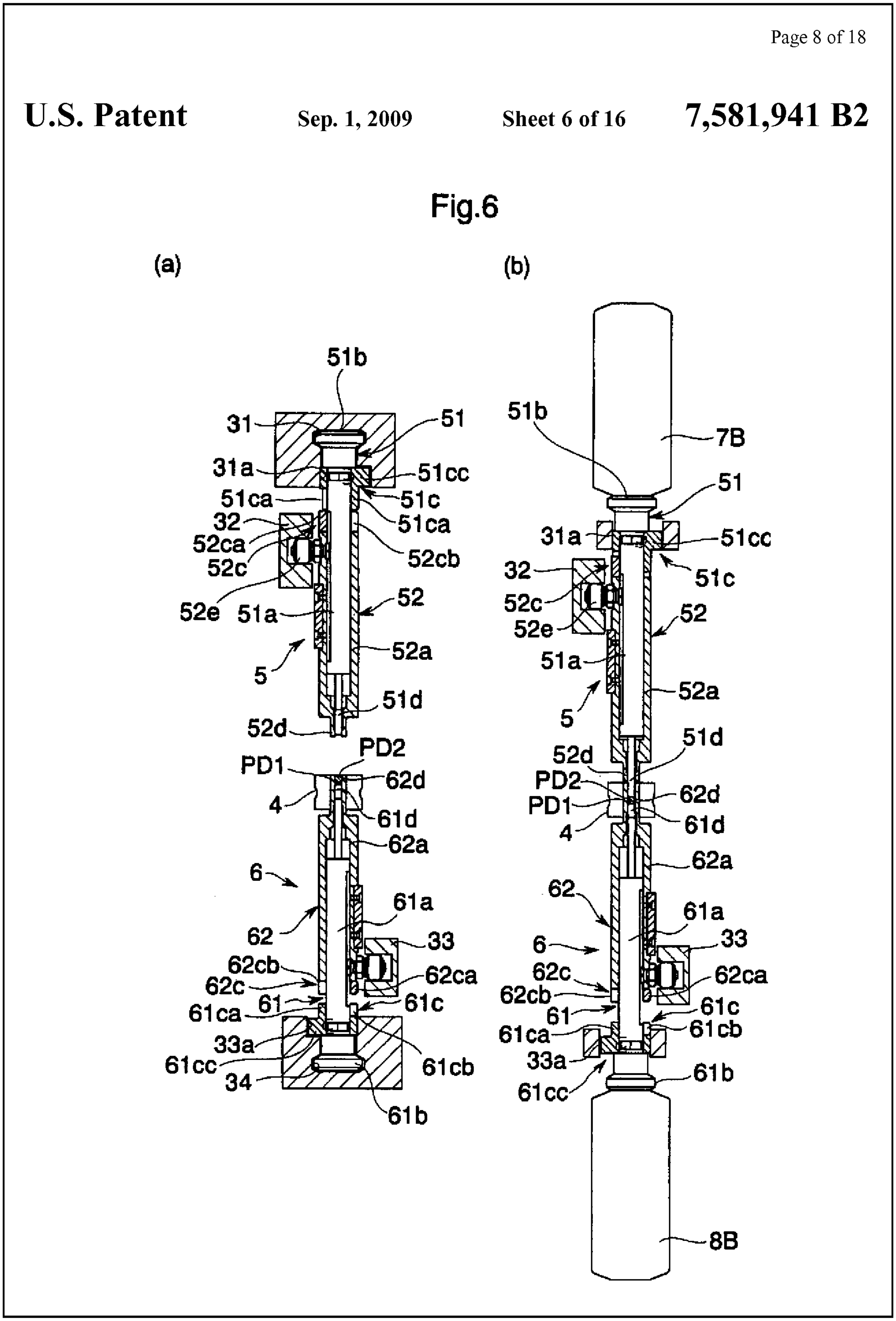
Figure 7:
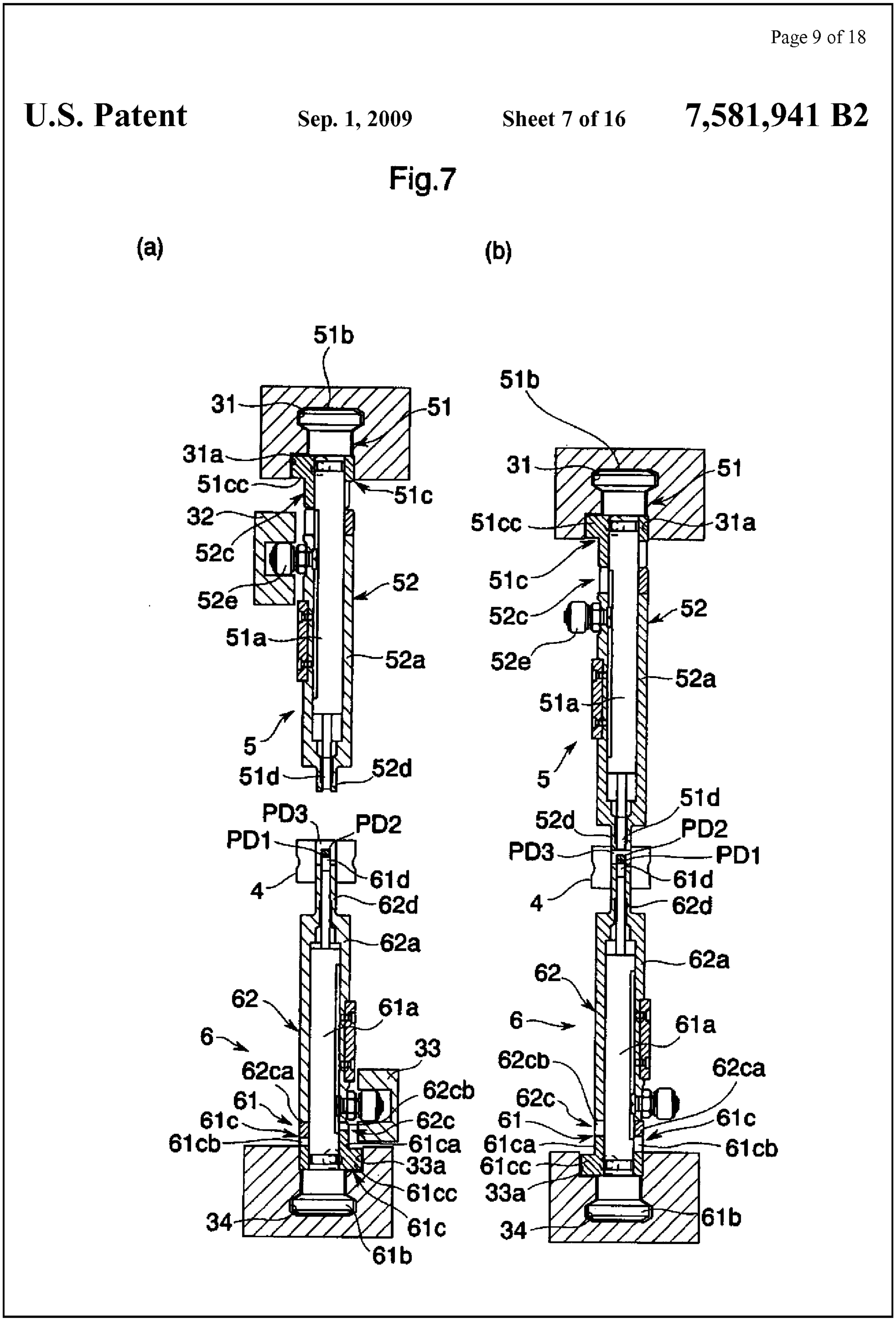
Figure 8:
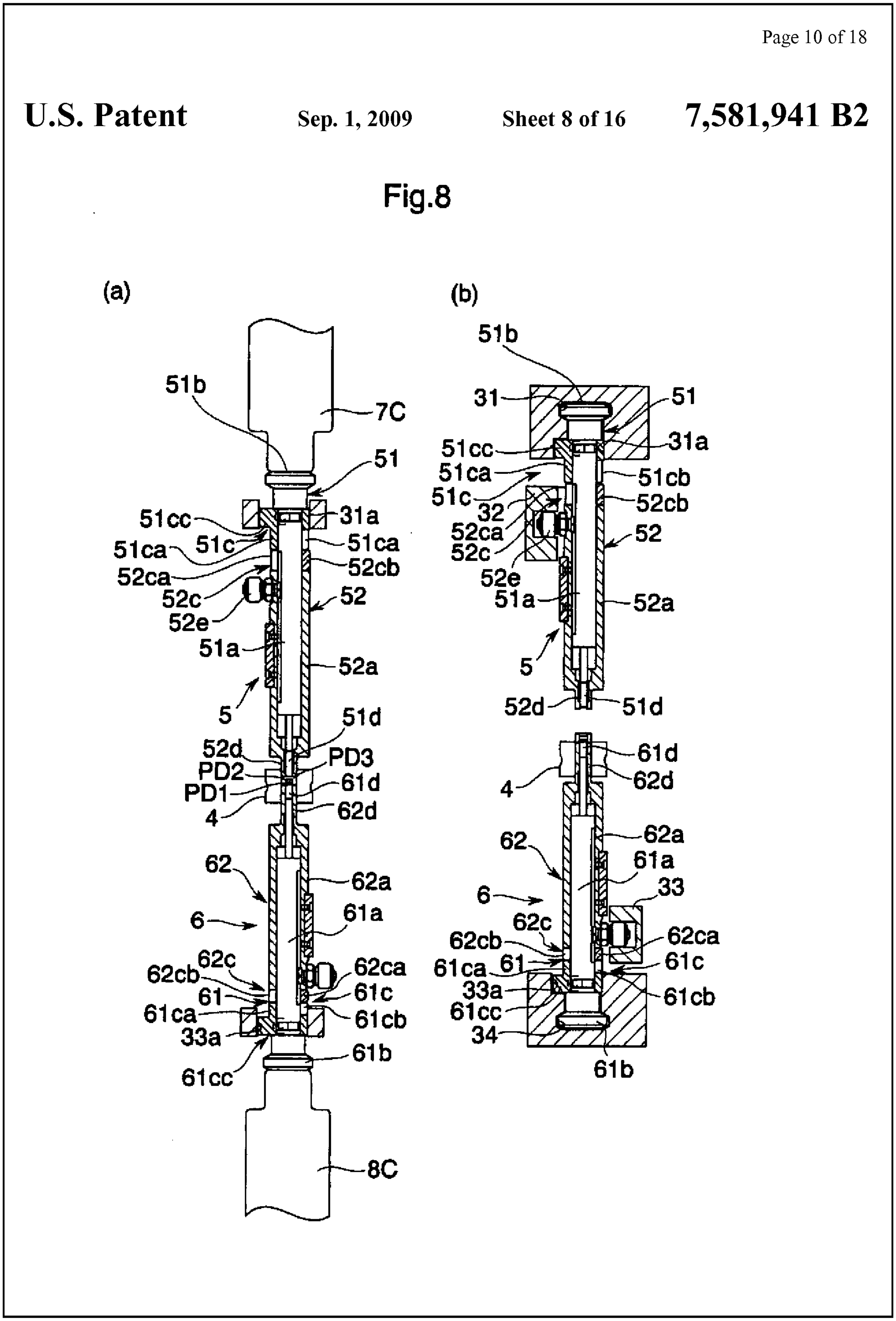
Figure 9:
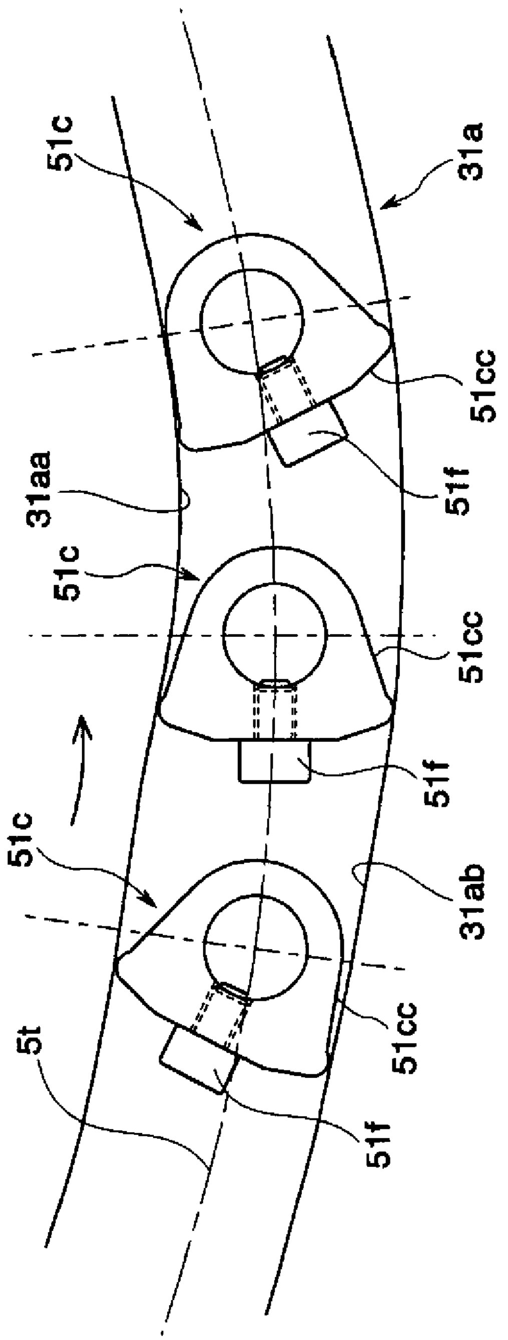
Figure 10:
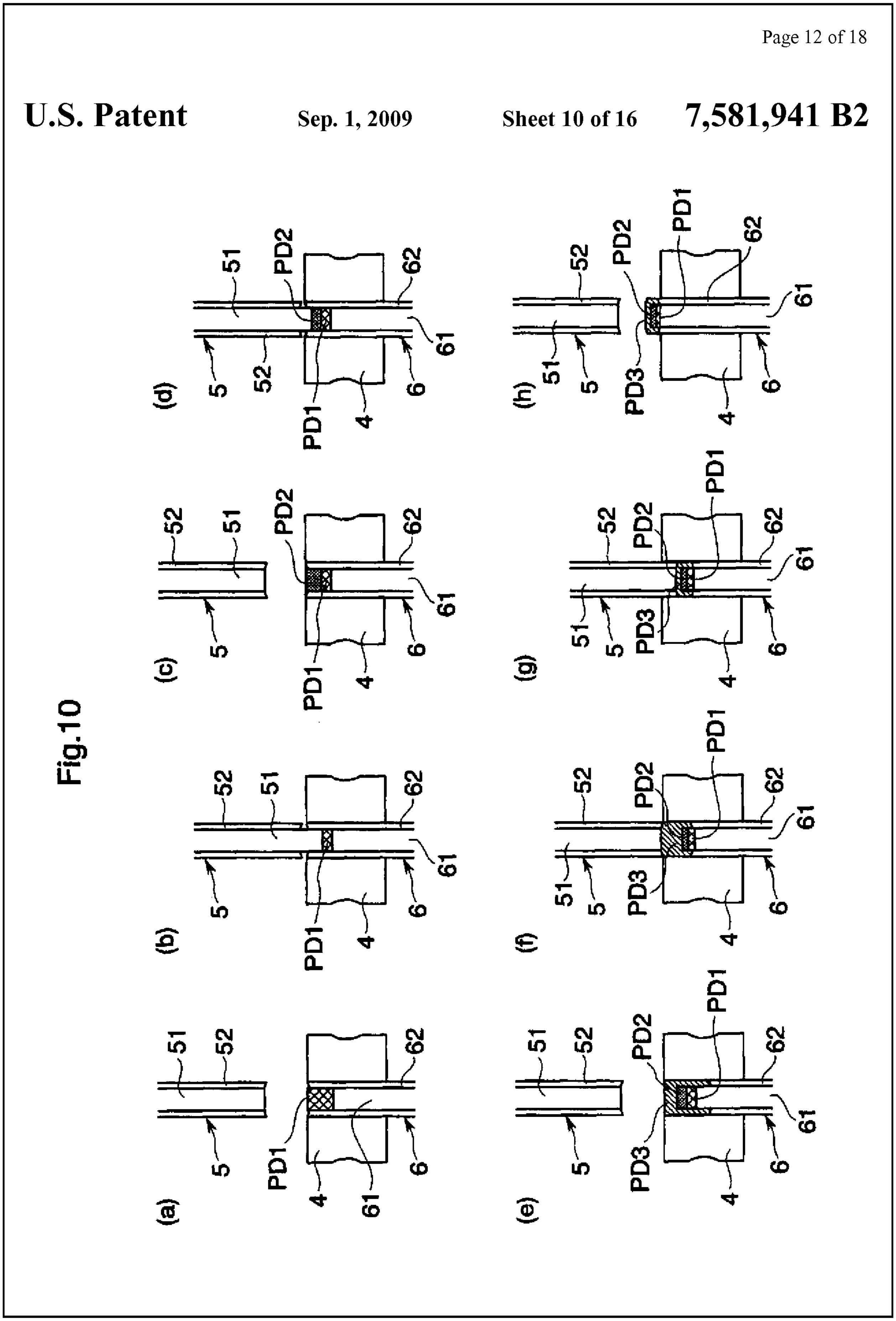
Figure 11:
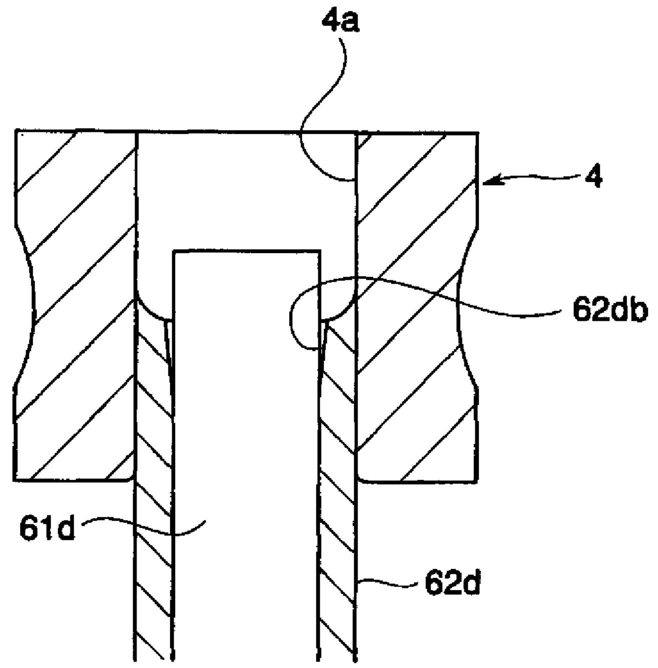
Figure 12:
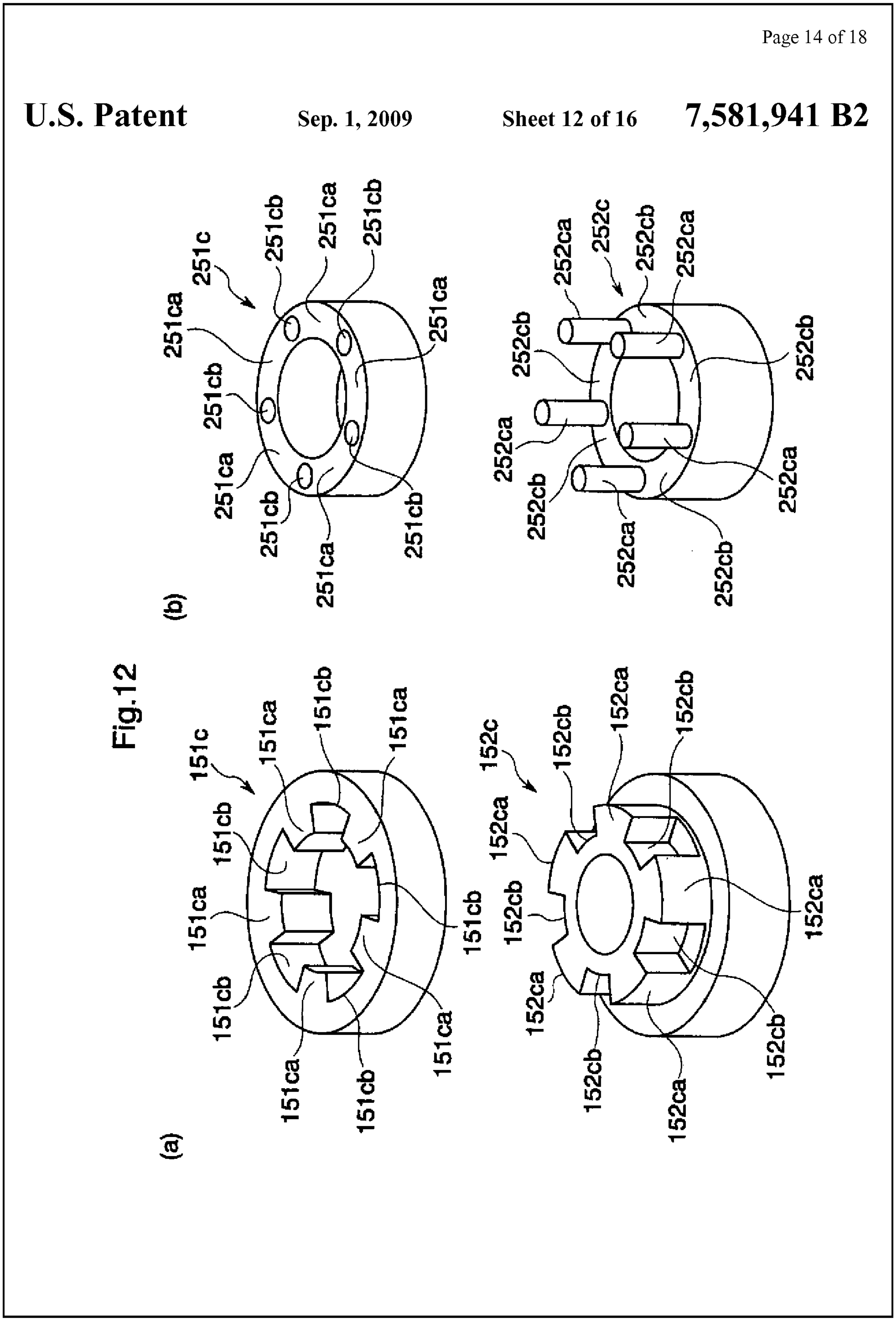
Figure 13:
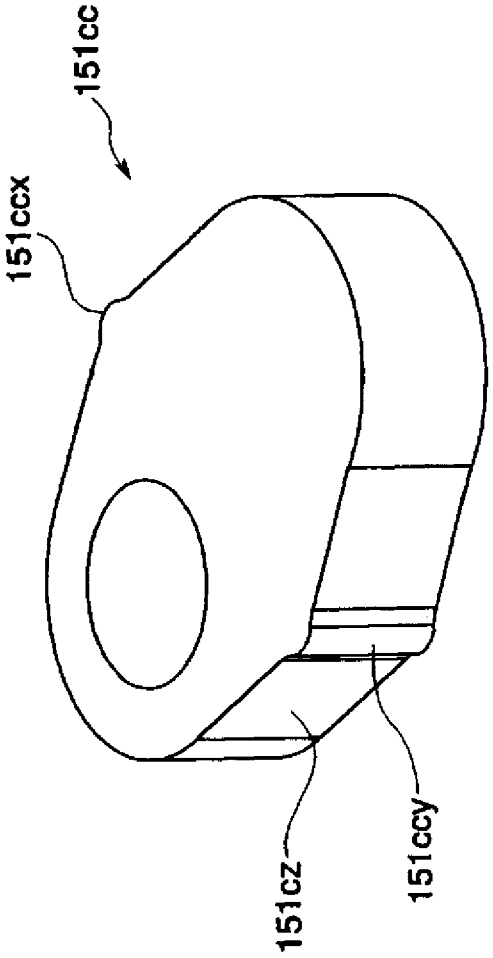
Figure 14:
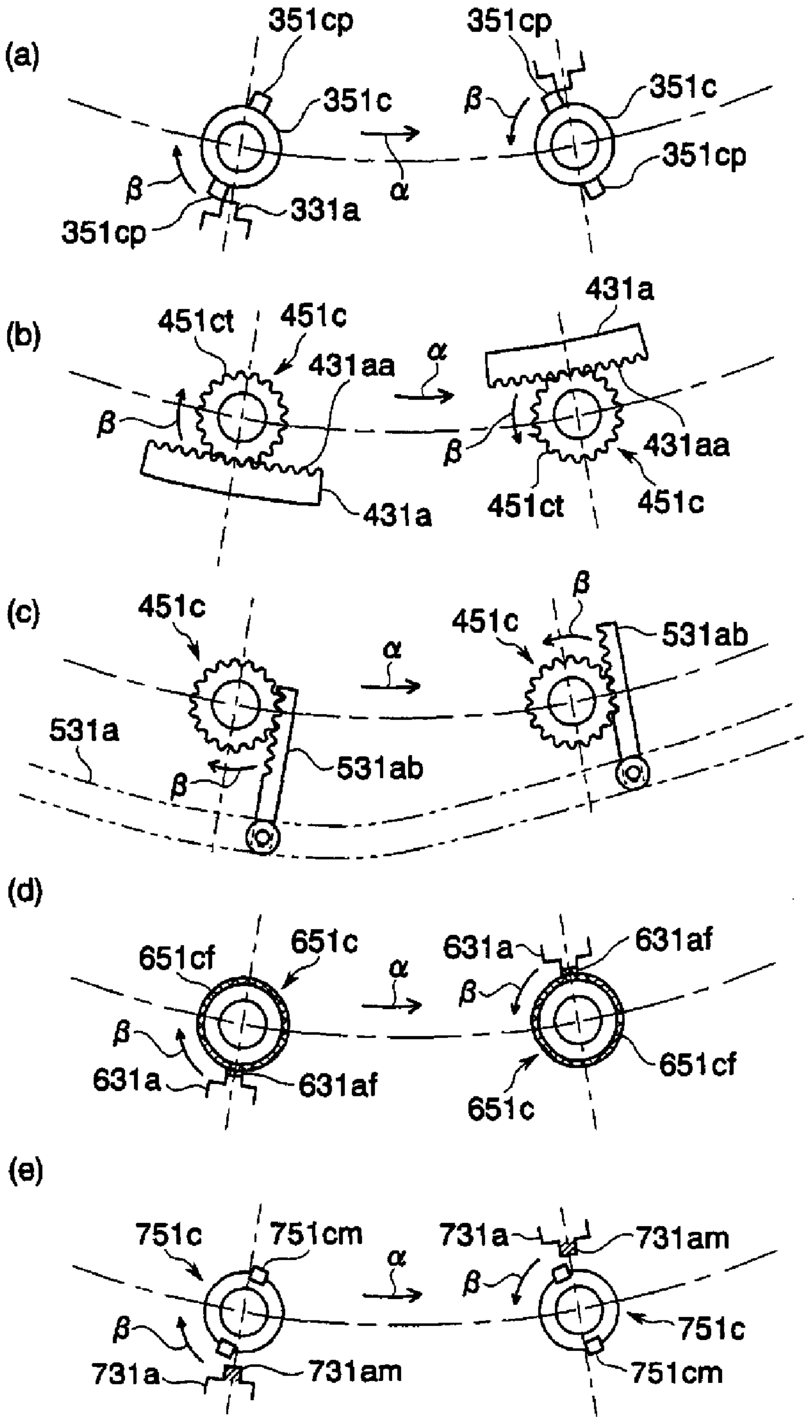
Figure 15:
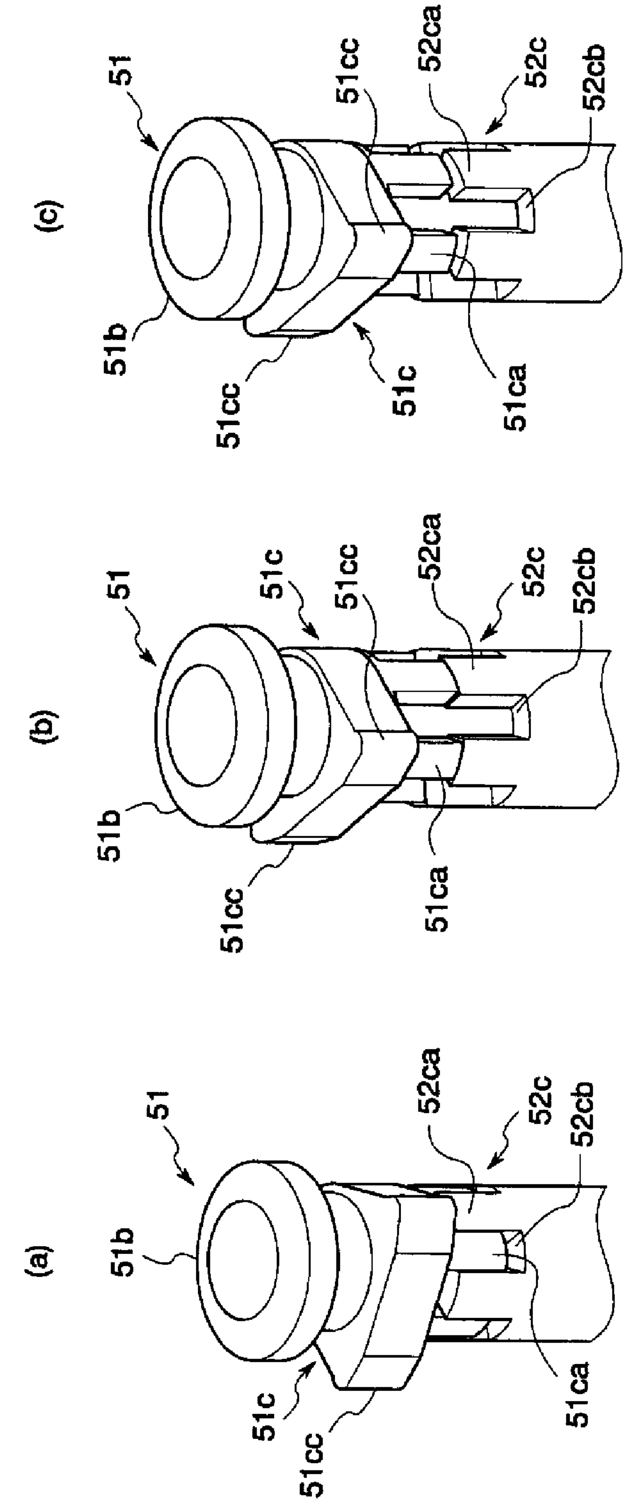
Figure 16:
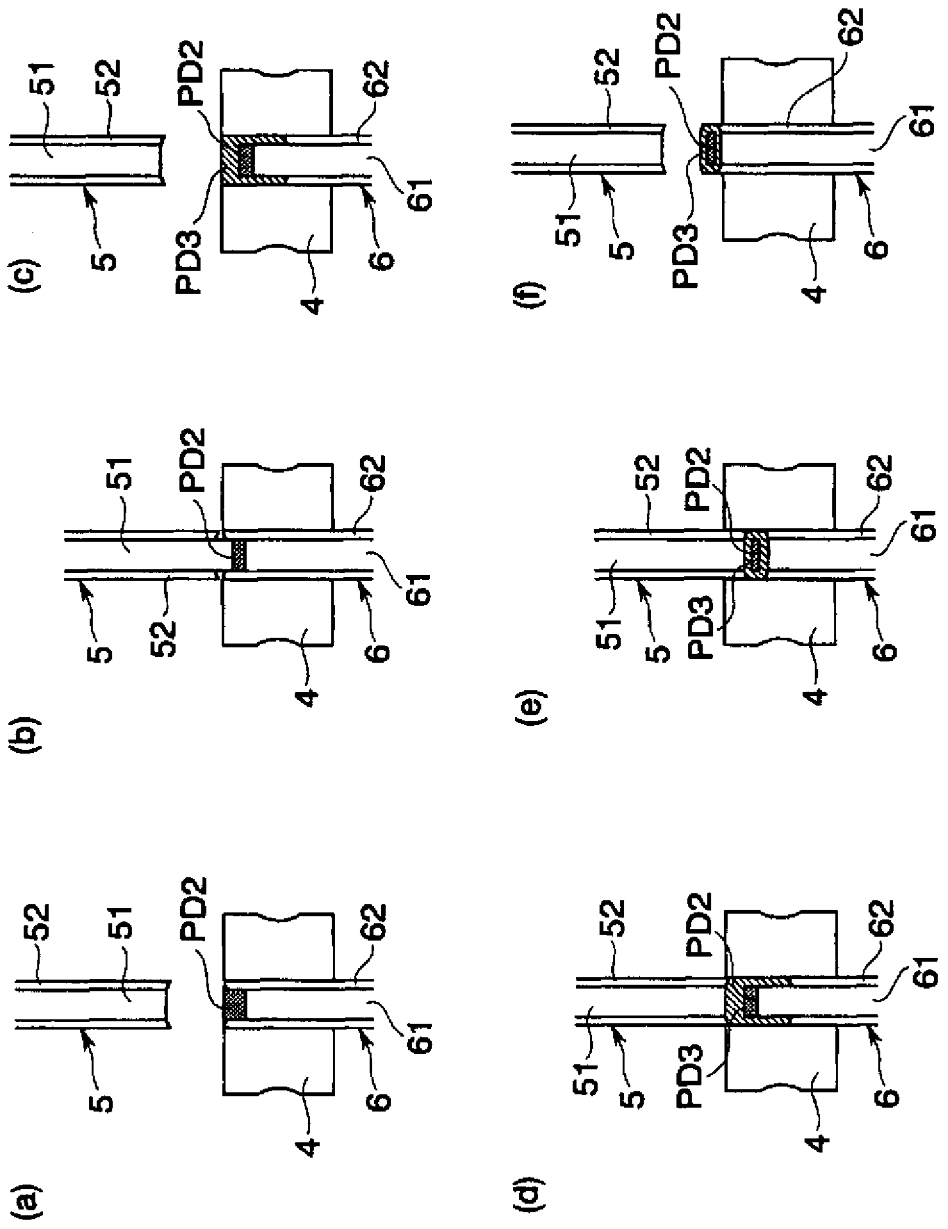

The first restricting component 51*c* forming part of the relative position restriction means is attached below the head portion 51*b* forming the upper end of the upper center punch 51, stated otherwise, attached to an upper end portion of the trunk portion 51*a* for rotation on the punch axis of the upper center punch 51. That is, the first restricting component 51*c* rotates independently of the upper center punch 51 while moving up and down along with the upper center punch 51. As shown in FIG. 4, the first restricting component 51*c* has an annular base portion 51*cd*, and projected portions 51*ca* and depressed portions 51*cb* formed alternately on the base portion 51*cd*. The projected portions 51*ca* and the depressed portions 51*cb* are formed downwardly, stated differently, toward the second restricting component 52*c*. In this embodiment, five projected portions 51*ca* and five depressed portions 51*cb* are formed. The first restricting component 51*c* is formed integrally with a plate component 51*cc* shaped like a bell in a plane view, which forms rotation control means. The bell-shaped plate component 51*cc* is guided with its movement transversal to its traveling direction restricted by the restricting component guide rail 31*a* forming rotation drive means. Rotation of the plate component 51*cc* can be controlled by varying the width of the guide rail, i.e., the width of the restricting component guide rail 31*a*, and the distance between the inner wall surface of the rail and the horizontal trajectory of the central axis of the punch. The "rotation control means for controlling rotation of the restricting component", as used in the present DESCRIPTION, is meant by a subject to be controlled by the rotation drive means provided externally of the punch, such as the restricting component guide rail 31*a* or the like.

The bell-shaped plate component 51*cc* is formed with a threaded hole 51*cf* for thread engagement with a restricting component fall-off stop pin 51*f* attaching the first restricting component 51*c* to the upper center punch 51 for rotation. An annular groove 51*cz* corresponding to the restricting component fall-off stop pin 51*f* is formed in a portion of the upper center punch 51 adjacent the head portion 51*b*. With the center punch 51 extending through the first restricting component 51*c*, the first restricting component 51*c* is rotatably attached to the upper center punch 51 by engagement between the tip of the restricting component fall-off stop pin 51*f* threadingly engaging the threaded hole 51*cf* and the annular groove 51*cz* as shown in FIG. 3 so as to be capable of moving up and down along with the upper center punch 51.

On the other hand, the second restricting component 52*c*, which is basically identical in shape with the first restricting component 51*c*, is attached to the upper outer punch 52 so as not to rotate on the punch axis of the upper center punch 51, with its depressed portions 52*ca* and projected portions 52*cb* oriented upward, i.e., toward the first restricting component 51*c*. For this reason, the second restricting component 52*c* neither includes a bell-shaped plate component serving as rotation control means nor is formed integrally with the aforementioned bell-shaped plate component 51*cc*. FIG. 15(*a*) shows relative position restriction means in a position corresponding to the positional relation between the upper outer punch 52 and the upper center punch 51 shown in FIG. 5(*b*). Similarly, FIGS. 15(*b*) and 15(*c*) show relative position restriction means in positions corresponding to the positional relations shown in FIGS. 7(*b*) and 7(*a*), respectively.

In the present embodiment, the lower punch 6 has basically the same configuration as the upper punch 5. Specifically, the lower punch 6 comprises lower center punch 61 and lower outer punch 62 circumscribing the lower center punch 61. The lower center punch 61 is slidably held in the lower outer punch 62 and is capable of pressing. The lower center punch 61 comprises trunk portion 61*a*, head portion 61*b* formed at the lower end of the trunk portion 61*a*, first restricting component 61*c* attached above the head portion 61*b* which forms part of the relative position restriction means, and punch tip 61*d* extending from the upper end of the trunk portion 61*a*. The first restricting component 61*c* of the lower center punch 61 is also formed integrally with a bell-shaped plate component 61*cc*. The lower outer punch 62 is cylindrically shaped and comprises trunk portion 62*a* housing the trunk portion 61*a* of the lower center punch 61 therein, second restricting component 62*c* attached to the lower end of the trunk portion 62*a* which forms part of the relative position restriction means, and punch tip 62*d* circumscribing the punch tip 61*d* of the lower center punch 61. Points of difference between the upper punch 5 and the lower punch 6 include dimensions, the extent of protrusion of the lower center punch tip 61*d* from the lower outer punch tip 62*d*, and like slight differences.

Following the flow of manufacturing process of a molding with core using the double-structured punch and rotary compression molding machine according to the present invention, detailed description will be made of the operations of the upper punch 5 and lower punch 6 and the relationship between the operations of the punches and the rotary compression molding machine guiding the punches. In the present embodiment, the molding with core is prepared through the steps of feeding and filling respective of the first molding material PD1 that will form an outer layer, the second molding material PD2 that will form a core, and the third molding material PD3 that will form an outer layer and the steps of compressing respective of these materials PD1, PD2 and PD3.

Initially, the lower center punch guide rail 34 guides the lower center punch 61 to the first molding material feeding and filling section PSD1 for the first molding material PD1 to be fed and filled and then the first quantity adjusting rail 35 holds the lower center punch 61 at a predetermined height corresponding to the amount of the first molding material PD1 to be fed and filled. At the same time, the lower outer punch guide rail 33 guides the lower outer punch 62 so that its punch tip 62*d* is positioned substantially coincident with the upper surface of the die 4 and holds the lower outer punch 62 in that position. With the lower punch in this condition, the first molding material feeding and filling section PSD1 feeds and fills the first molding material PD1 that will form an outer-layer of the aimed molding with core into a space that is defined above the punch tip 61*d* of the lower center punch 61 within the die bore 4*a* and surrounded by the punch tip 62*d* of the lower outer punch 62. Here, the first and second restricting components 61*c* and 62*c* of the lower punch 6 are in a spaced-apart position, that is, the relative position of the lower center punch 61 and the lower outer punch 62 is kept assuming the third position.

At that time, the upper punch 5 is positioned in the first molding material feeding and filling section PSD1 so as not to interfere with the filling of the first molding material PD1. Specifically, the upper center punch 51 and the upper outer punch 52 are guided to their respective highest positions by the upper center punch guide rail 31 and the upper outer punch guide rail 32, respectively, before the upper punch 5 reaches the first molding material feeding and filling section PSD1, preferably with the punch tip 51*d* of the upper center punch 51 in a position not protruding from the punch tip 52*d* of the upper outer punch 52. The upper punch 5 held in that position reaches and then passes through the first molding material feeding and filling section PSD1 (FIG. 5(*a*)).

After the filling of the first molding material PD1 into the aforementioned space within the die bore 4*a*, the upper outer punch 52 is guided by the upper outer punch guide rail 32 to a position where its punch tip 52*d* becomes substantially coincident with the upper surface of the die 4 by the time the upper punch 5 reaches the first pre-compression roll 7A. At that time, the punch tip 52*d* fails to touch the upper surface of the die 4. When the upper punch 5 passes the first pre-compression roll 7A, the punch tip 51*d* of the upper center punch 51 is inserted into the space filled with the first molding material PD1 within the die bore 4*a*.

At that time, the first and second restricting components 51*c* and 52*c* of the upper punch 5 assume a position in which the projected portions 52*ca* of the second restricting component 52*c* are each inserted in a respective one of the depressed portions 51*cb* of the first restricting component 51*c*. Accordingly, the relative position of the upper center punch 51 and upper outer punch 52 is restricted to the first position. With the upper center punch 51 and the upper outer punch 52 in that positional relation, only the upper center punch 51 is pressed by the upper first pre-compression roll 7A in the first pre-compression, so it is preferable that the first and second restricting components 51*a* and 52*c* fail to contact with each other vertically. During the first pre-compression, the lower center punch 62 of the lower punch 6 is held at a slightly lower position than in the first molding material feeding and filling section PSD1 in order to prevent overflow of the first molding material PD1 which would occur upon insertion of the punch tip 51*d* of the upper punch 51 into the space within the die bore 4*a*.

In this way, the upper and lower punches 5 and 6 are pressed to pre-compress the first molding material PD1 when they pass through between the first pre-compression rolls 7A and 8A. Thus, an outer layer portion underlying a molded core portion is molded. During the first pre-compression, the positions of the upper outer punch 52 and the lower outer punch 62 are kept by the upper outer punch guide rail 32 and the lower outer punch guide rail 33, respectively, so that their respective punch tips 52*d* and 62*d* fail to contact with each other (FIG. 5(*b*)).

Subsequently, as in the process up to the feeding and filling of the first molding material PD1, the upper and lower punch 5 and 6 are guided to the second molding material feeding and filling section PSD2 for the second molding material PD2 to be fed and filled. In the second molding material feeding and filling section PSD2, the second molding material PD2 is fed and filled on the upper surface of the outer layer portion of the molding with core obtained by the first pre-compression, i.e., in a space that is defined above the resulting provisional molding molded from the first molding material PD1 on the punch tip 61*d* of the lower center punch 62 and surrounded by the punch tip 62*d* of the lower outer punch 62. At that time, the position of the lower center punch 61 is adjusted by the second quantity adjusting rail 36 to allow a predetermined amount of the second molding material PD2 to be fed and filled (FIG. 6(*a*)). The relative position of the lower center punch 61 and lower outer punch 62 assumes the third position at that time.

After the second molding material PD2 has been thus stacked on the upper surface of the outer layer portion obtained by the pre-compression, the upper and lower punches 5 and 6 pass through between the second pre-compression rolls 7B and 8B to compress the outer layer portion and the second molding material PD2 into one piece by the upper and lower center punches 51 and 61, thus a provisional molding comprising the outer layer portion and the core is molded. The positional relationship between the first and second restricting components 51*c* and 52*c* in the second pre-compression is the same as in the first pre-compression (FIG. 6(*b*)).

Finally, for the third molding material PD3 to be fed and filled, in the lower punch 6, the lower outer punch 62 is lowered by the lower outer punch guide rail 33 with the lower center punch 61 held at the same height as in the second pre-compression by the lower center punch guide rail 34, so that the punch tip 61*d* of the lower center punch 61 becomes protruded from the punch tip 62*d* of the lower outer punch 62. On the other hand, the upper punch 5 is held at such a height as not to interfere with the feeding and filling of the third molding material PD3 into the die bore 4*a* as in the above-described first and second molding material feeding and filling sections PSD1 and PSD2.

Figure 7:
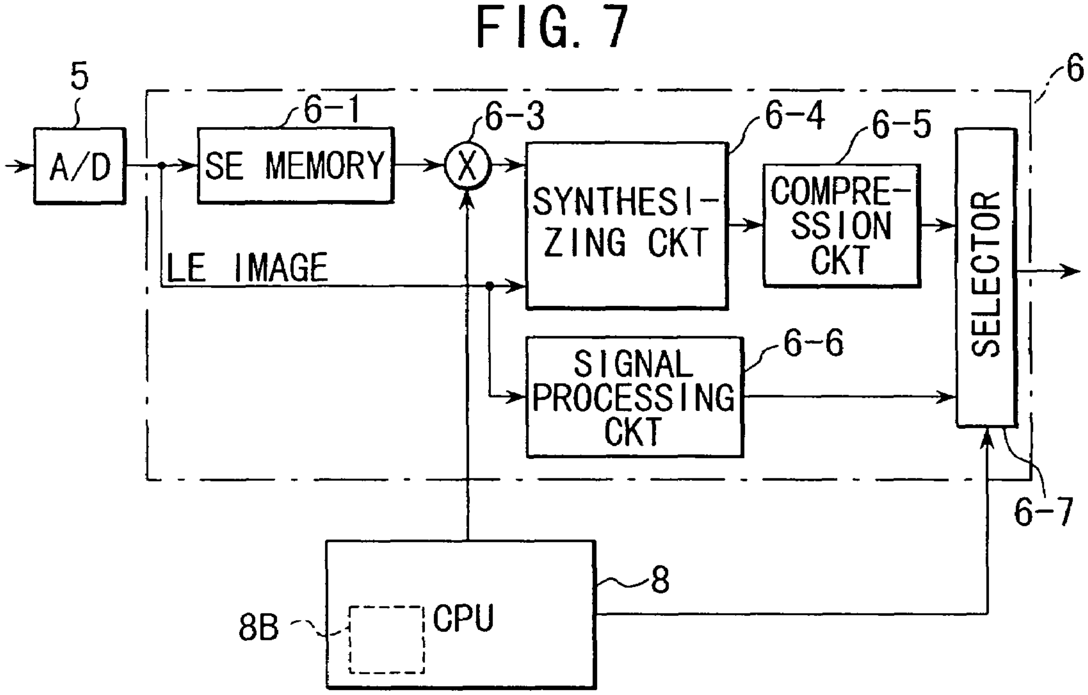
FIG. 7 is an enlarged sectional view showing a portion of concern of the same embodiment for illustrating the upper and lower punches in a condition (a) assumed during third molding material feeding and filling and in a condition (b) assumed during provisional compression.

At that time, the projected portions 62*ca* of the second restricting component 62*c* of the lower punch 6 are each inserted in a respective one of the depressed portions 61*cb* of the first restricting component 61*c*, so that the punch tip 61*d* of the lower center punch 61 becomes protruded from the punch tip 62*d* of the lower outer punch 62. Accordingly, the relative position of the lower center punch 61 and the lower outer punch 62 is restricted to the first position. In that condition, the first and second restricting components 61*c* and 62*c* fail to contact with each other vertically. With the upper and lower punches 5 and 6 thus positioned, the third molding material PD3 is fed and filled into the die bore 4*a*. The third molding material PD3 thus fed and filled is deposited on the side periphery of the molding resulting from the second pre-compression and on an upper portion of the molding. Here, it is possible that the third molding material PD3 is fed and filled while the lower outer punch 62 is being lowered (FIG. 7(*a*)). In the case of FIG. 7(*a*), the feeding and filling of the third molding material PD3 is performed until the punch tip 61*d* of the lower center punch 61 is finally protruded from the punch tip 62*d* of the lower outer punch 62. However, it is possible to feed and fill the third molding material PD3 into the die bore 4*a* with the punch tips 61*d* and 62*d* of respective of the lower center punch 61 and the lower outer punch 62 aligned with each other.

After the third molding material PD3 thus fed and filled into the die bore 4*a*, the upper punch 5 becomes held in a position in which the punch tips 51*d* and 52*d* of respective of the upper center punch 51 and the upper outer punch 52 are coincident with each other, i.e., in the second position by the time the main compression rolls 7C and 8C are reached. At that time, the first restricting component 51*c* having the bell-shaped plate component 51*cc*, which is provided on the upper punch 5, is rotated to bring the projected portions 51*ca* of the first restricting component 51*c* and the projected portions 52*ca* of the second restricting component 52 into contact with each other in order to align the punch tips 51*d* and 52*d* of respective of the upper center punch 51 and the upper outer punch 52 with each other. With the relative position of the upper center punch 51 and the upper outer punch 52 being restricted to the second position, contact between the first and second restricting components 51*c* and 52*c* enables a pressing force applied to the head portion 51*b* of the upper center punch 51 to be transmitted to the upper outer punch 52 through the first and second restricting components 51*c* and 52*c*.

Figure 9:
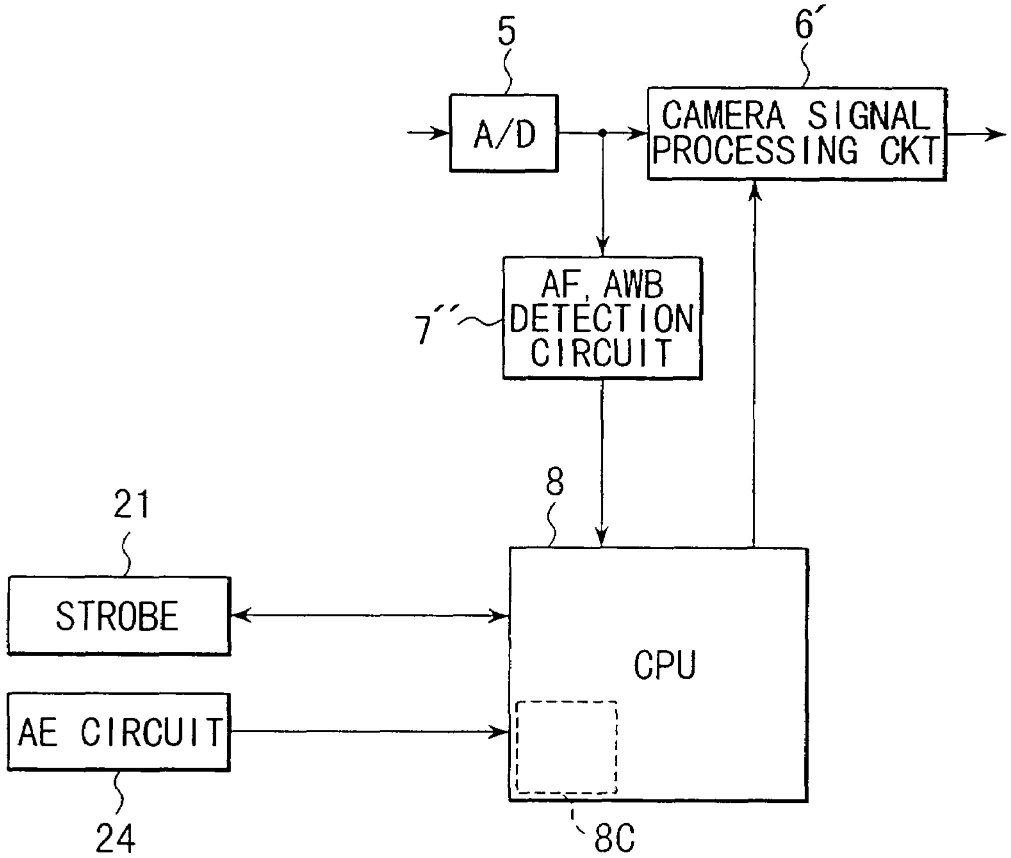
FIG. 9 is a view schematically illustrating the operations of rotation control means and rotation drive means included in the rotary compression molding machine according to the same embodiment for rotation control by varying the width of a restricting component guide rail and the distance between an inner wall surface of the rail and a horizontal trajectory of a central axis of the punch.

Rotation control over the first restricting component 51*c* is performed as follows. In order to control rotation of the first restricting component 51*c* formed integral with the bell-shaped plate component 51*cc*, the inner wall surface 31*aa*, which lies on the vertical shaft 2 side of the restricting component guide rail 31*a* guiding the bell-shaped plate component 51*cc* is formed so as to come close to the horizontal trajectory 5*t* of the central axis of the upper punch 5; stated otherwise, the inner wall surface 31*aa* of the restricting component guide rail 31*a* is formed so as to decrease the distance between itself and the horizontal trajectory 5*t* (FIG. 9). When the bell-shaped plate component 51*cc* passes through the portion of the restricting component guide rail 31*a* having the aforementioned distance thus decreased, the inner wall surface 31*aa* exerts a braking force (frictional force) on the bell-shaped plate component 51*cc*. In contrast to the inner wall surface 31*aa*, the outer wall surface 31*ab* of the restricting component guide rail 31*a* is formed so as to be spaced more apart from the horizontal trajectory 5*t* to such an extent as not to hinder the rotation of the first restricting component 51*c*. For this reason, the outer wall surface 31*ab* exerts a smaller braking force on the bell-shaped plate component 51*cc* than the inner wall surface 31*aa*. Such a difference in braking force exerted on the bell-shaped plate component 51*cc* between the inner wall surface 31*aa* and outer wall surface 31*ab* of the restricting component guide rail 31*a* causes a rotational force to be exerted on the bell-shaped plate component 51*cc*. That is, rotation control is performed so as to rotate the first restricting component 51*c* by a predetermined amount in a predetermined direction, for example in the counterclockwise direction, by imparting an unintermittent cam motion to the bell-shaped plate component 51*cc*.

The upper punch 5 is thus lowered toward the lower punch 6 by the upper center punch guide rail 31 and the upper outer punch guide rail 32. With the punch tips 51*d* and 52*d* of respective of the upper center punch 51 and the upper outer punch 52 finally aligned with each other, the upper punch 5 presses down the third molding material PD3 including the provisional molding comprising the outer layer portion and the core to perform provisional compression, while the lower outer punch 62 of the lower punch 6 is raised by the lower outer punch guide rail 33. Thus, the third molding material PD3, particularly a portion thereof that will form the sidewall of the intended molding is provisionally compressed. By raising only the lower outer punch 62 toward the upper punch 5, the projected portions 61*ca* of the first restricting component 61*c* of the lower punch 6 and the depressed portions 62*cb* of the second restricting component 62*c* of the lower punch 6 are released from their meshing state, thereby allowing the first restricting component 61*c* to rotate (FIG. 7(*b*)) as will be described later. Release from the meshing state can also be achieved by lowering only the lower center punch 61 toward the head portion 61*b* of the lower punch 6 or by combining the raising of the lower outer punch 62 with the lowering of the lower center punch 61. Though not preferable in terms of the structure and movement of the punch, the first restricting component 61*c* may be allowed to rotate with the projected portions 61*ca* of the first restricting component 61*c* and the depressed portions 62*cb* of the second restricting component 62*c* kept in point or proximal contact with each other without complete release from their meshing state.

Subsequently, as is the case with the upper punch 5, the first restricting component 61*c* having the bell-shaped plate component 61*cc*, which is provided on the lower punch 6, is rotated to bring the projected portions 61*ca* of the first restricting component 61*c* and the projected portions 62*ca* of the second restricting component 62 into contact with each other in order to align the punch tips 61*d* and 62*d* of respective of the lower center punch 61 and the lower outer punch 62 with each other. Thus, the relative position of the lower center punch 61 and the lower outer punch 62 is restricted to the second position. Rotation control over the first restricting component 61*c* is the same as that over the first restricting component 51*c* of the upper punch 5. In this way, the punch tips 61*d* and 62*d* of respective of the lower center punch 61 and the lower outer punch 62 of the lower punch 6 are positioned coincidentally with each other to allow a pressing force applied to the head portion 61*b* of the lower center punch 61 to be transmitted to the lower outer punch 62 through the first and second restricting components 61*c* and 62*c*.

Figure 8:
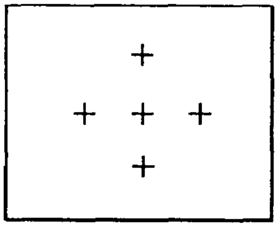
FIG. 8 is an enlarged sectional view showing a portion of concern of the same embodiment for illustrating the upper and lower punches in a condition (a) assumed during main compression and in a condition (b) assumed during removal of a molding.

When the upper and lower punches 5 and 6 pass through between the main compression rolls 7C and 8C with the punch tips 51*d* and 52*d* of respective of the upper center punch 51 and the upper outer punch 52 as well as the punch tips 61*d* and 62*d* of respective of the lower center punch 61 and the lower outer punch 62 aligned substantially coincident with each other, the intended molding with core in the die bore 4*a* is molded (FIG. 8(*a*)).

The molding with core thus molded in the die bore 4*a* is ejected from the die bore 4*a* by the lower punch 6 raised with the punch tips 61*d* and 62*d* of respective of the center punch 61 and outer punch 62 aligned with each other, i.e., with the projected portions 61*ca* of the first restricting component 61*c* and the projected portions 62*ca* of the second restricting component 62 kept in contact with each other (FIG. 8(*b*)). In some cases, it is possible to eject the molding with core from the die bore 4*a* to the outside of the machine with the projected portions 62*ca* of the second restricting component 62*c* inserted in the respective depressed portions 61*cb* of the first restricting component 61*c*, hence, with the punch tip 61*d* of the lower center punch 61 protruded from the punch tip 62*d* of the lower outer punch 62.

Thereafter, by the time the upper and lower punches 5 and 6 reach the first molding material feeding and filling section PSD1, the relative position of the upper center punch 51 and the upper outer punch 52 and that of the lower center punch 61 and the lower outer punch 62 are varied by rotation control over the first restricting components 51*c* and 61*c*. Such rotation control is performed in reverse of the aforementioned rotation control (counterclockwise rotation), for example, the rotation control over the first restricting component 51*c* is performed by adjusting the distance between the horizontal trajectory 5*t* and the inner wall surface 31*aa* of the restricting component guide rail 31*a* and the distance between the horizontal trajectory 5*t* and the outer wall surface 31*ab* of the restricting component guide rail 31*a*, i.e., by forming the outer wall surface 31*ab* brought close to the horizontal trajectory 5*t* and forming the inner wall surface 31*aa* brought apart from the horizontal trajectory 5*t* to such an extent as not to hinder the rotation of the first restricting component 51*c*.

Figure 10:
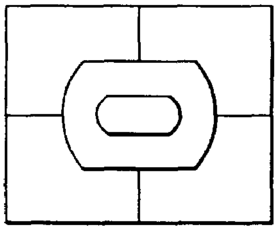
FIG. 10 is an explanatory view illustrating the principle of the compression molding process according to the same embodiment.
Figure 11:
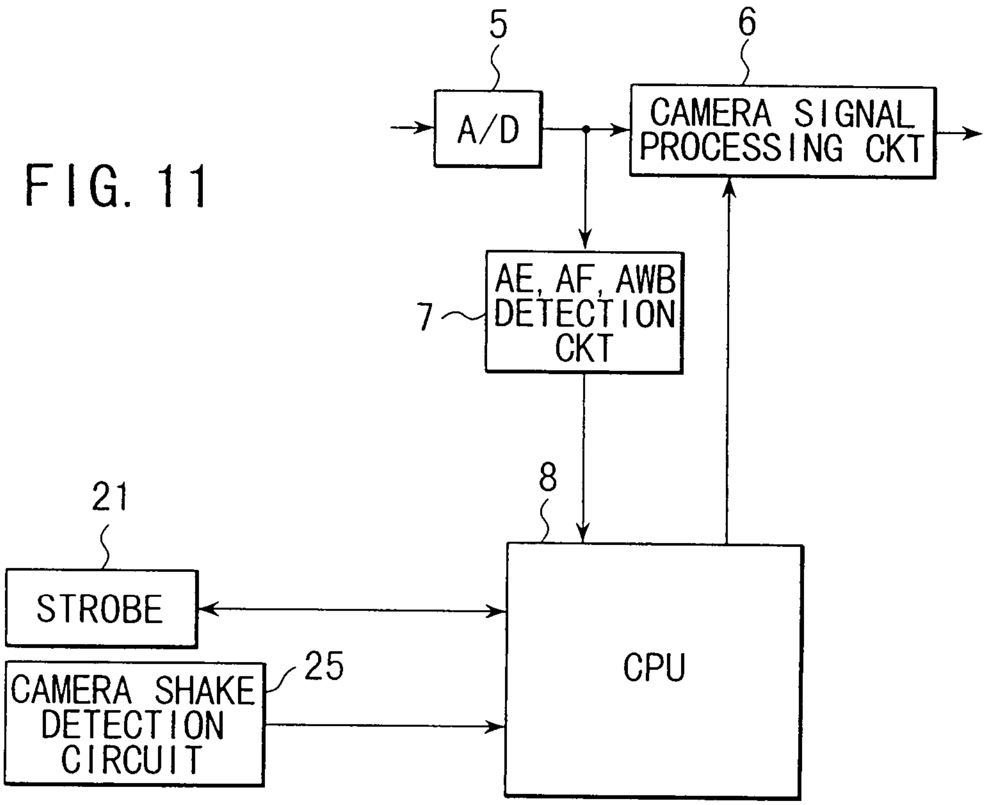
FIG. 11 is an enlarged sectional view showing a lower punch tip having an outer punch tip end portion with an inner peripheral surface comprising a tapered inner peripheral surface which widens as it extends toward the tip end according to one embodiment of the present invention.

FIG. 10 collectively illustrates the flow of a series of the above-described process steps for preparing the molding with core. FIG. 10(*a*) corresponds to the process step illustrated in FIG. 5(*a*) and, similarly, FIGS. 10(*b*) to 10(*h*) correspond to FIGS. 5(*b*), 6(*a*), 6(*b*), 7(*a*), 7(*b*), 8(*a*) and 8(*b*), respectively.

Since the relative position of the punch tips 51*d*, 61*d* and 52*d*, 62*d* of respective of the center punch 51,61 and the outer punch 52,62 can be controlled by means of the annular first restricting component 51*c*,61*c* and the annular second restricting component 52*c*,62*c* according to the present embodiment, the punch 5,6 can be simplified in structure and reduced in size while ensuring that the center punch 51,61 and the outer punch 52,62 can slide freely. Further, since the pressing force applied to the center punch 51,61 can be transmitted to the outer punch 52,62 by means of the first restricting component 51*c*,61*c* and the second restricting component 52*c*,62*c*, it is possible to avoid the compression rolls becoming complicated in structure. Moreover, the punches and the compression rolls 7A, 7B, 7C, 8A, 8B and 8C, which are simplified in structure, can be enhanced in mechanical strength, hence, improved in durability.

After the process step of pre-compressing a part of the outer layer and the core, the resulting provisional molding is raised in the die bore 4*a* by the lower center punch 61, and the condition where the punch tip 61*d* of the lower center punch 61 is protruded from the punch tip 62*d* of the lower outer punch 62 is assumed. Subsequently, under that condition, the third molding material PD3 is fed and filled into the space in the die bore 4*a* and then the punch tip 62*d* of the lower outer punch 62 is relatively raised to pre-compress the third molding material PD3, particularly, a portion of the third molding material PD3 that will form the sidewall of the intended molding, followed by main compression with the punch tips 61*d* and 62*d* rendered coincident with each other. Accordingly, the packing density of the molding material forming the sidewall of the compressed molding necessarily becomes high. For this reason, it is possible to enhance the strength of the sidewall portion of the compressed molding, hence, improve the friability of the sidewall of the molding.

In addition, since the punch tip 61*d* of the lower center punch 61 can be protruded from the punch tip 62*d* of the lower outer punch 62, easy sampling is possible for checking over the provisional molding obtained from each compression step. It is needless to say that a provisional molding having an extremely small thickness can be sampled by the use of a scraper.

Figure 16:
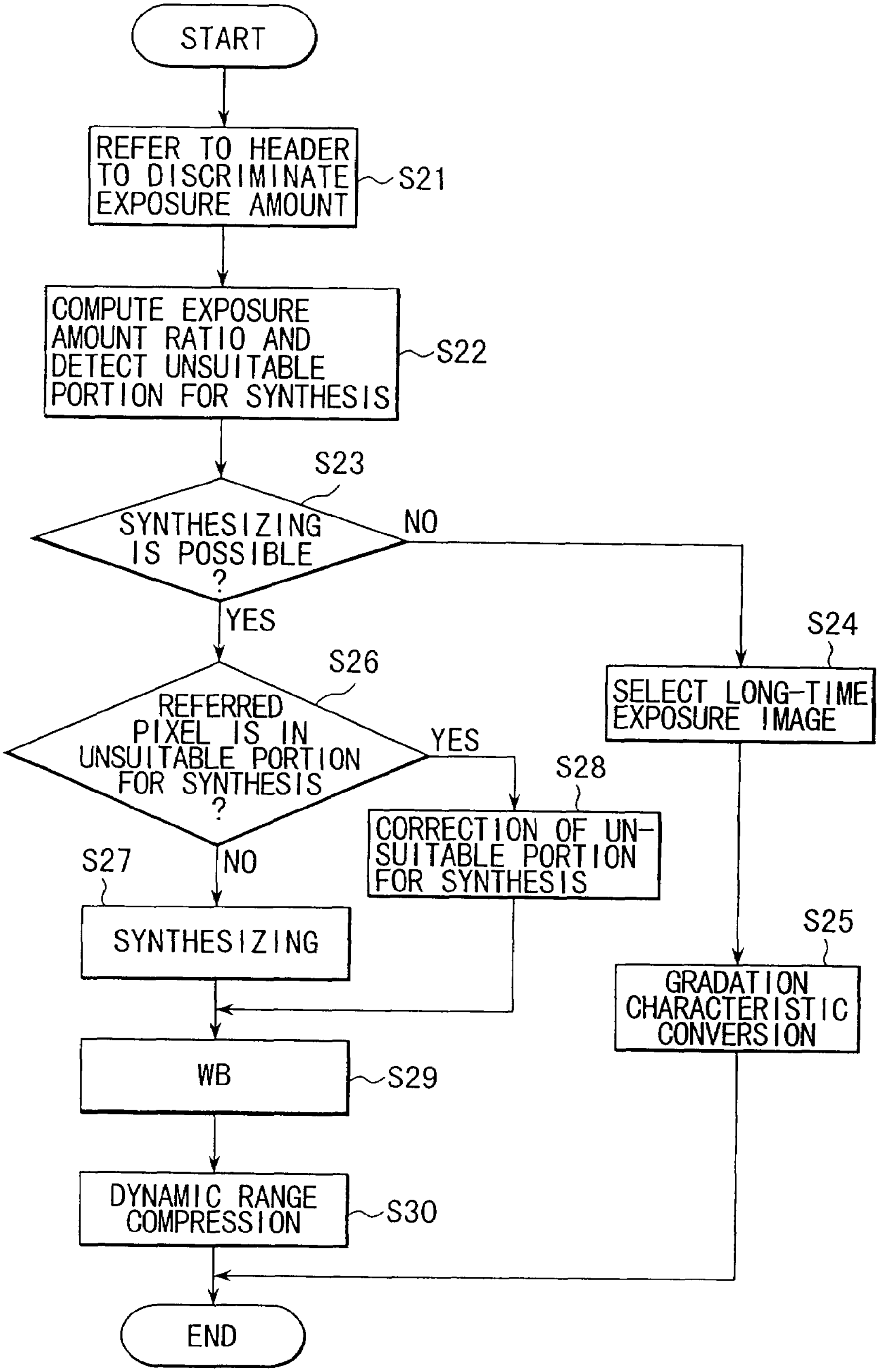
FIG. 16 is a development showing another embodiment of a rotary compression molding machine according to the present invention for illustrating the flow of manufacturing process of a molding with core and the movement of a punch relative to a turret operating.
Figure 1:
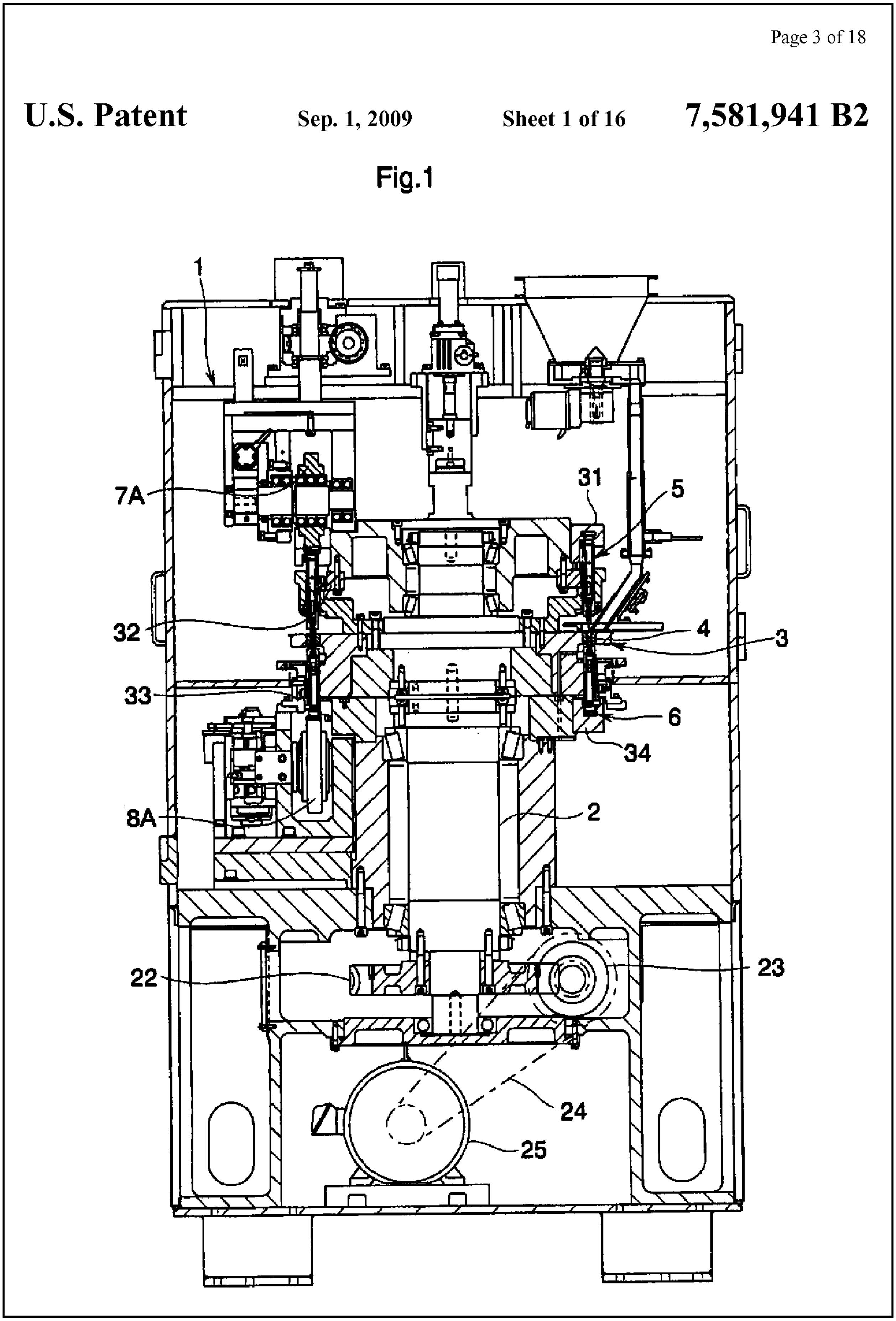

With the rotary compression molding machine according to the present invention using the punch of the present invention as the lower punch as described above, such a phenomenon was observed that the feeding and filling of the second molding material PD2 into the bore 4 with the punch tip 61*d* of the lower center punch 61 sufficiently protruded from the punch tip 62*d* of the lower outer punch 62 after the pre-compression of the first molding material fed and filled into the lower outer punch 62 allowed the second molding material PD2 to be led to under the molding of the first molding material and cover the molding during the step of aligning the punch tips 61*d* and 62*d* with each other to perform the subsequent whole molding step, i.e., during the transition from the first position to the second position. This means that a rotary compression molding machine provided with only two molding material feeding and filling sections is capable of preparing a molding with core. The rotary compression molding machine according to this embodiment has molding material feeding and filling sections including a first molding material feeding and filling section for feeding the first molding material PD1 and a second molding material feeding and filling section for feeding the second molding material, and pre-compression means comprising first pre-compression means for compressing the first molding material. The present embodiment preferably includes additional second pre-compression means for compressing the second molding material PD2 because pre-compression is preferably performed during the step of aligning the punch tip 61*d* of the lower center punch 61 and the punch tip 62*d* of the lower outer punch 62 with each other, i.e., during the transition from the first position to the second position. FIG. 16 is a development illustrating the flow of process steps for preparing a molding with core corresponding to this embodiment.

Three methods of causing the lower center punch 61 and the lower outer punch 62 to slide to change the relative position thereof from the first position to the second position are conceivable for not only the embodiment with two molding material feeding and filling sections but also the foregoing embodiment with three molding material feeding and filling sections PSD1, PSD2 and PSD3. Specifically, the three methods include: one comprising raising the lower outer punch 62 to align the lower outer punch tip 62*d* with the lower center punch tip 61*d*; one comprising lowering the lower center punch 61 to align the lower center punch tip 61*d* with the lower outer punch tip 62*d*; and one comprising raising the lower outer punch 62 while lowering the lower center punch 61 to align their respective punch tips 61*d* and 62*d* with each other. With any one of the methods, pressurization by the upper punch 5 is preferable. Such pressurization can be achieved by a rail itself or a compression roll. The following description is directed to preferable manners of pre-compression accommodated to the difference in sliding movement between the lower center punch 61 and the lower outer punch 62 and to the expected effects.

In the case where the effect that the second molding material PD2 is led to under the molding of the first molding material to cover the lower side of the molding (hereinafter will be referred to "effect of leading an outer layer") is desired, i.e., in the method of preparing a molding with core by the use of only two molding material feeding and filling sections, the method comprising lowering the lower center punch 61 to align the lower center punch tip 61*d* with the lower outer punch tip 62*d* is most preferable. In this case, it is preferable to perform pre-compression temporarily just before the lower center punch 61 starts lowering. Specifically, the upper punch 5 temporarily pressurizes the molding and the molding material on the lower punch 6 with the relative position of the lower center punch 61 and the lower outer punch 62 assuming the first position just before the lower center punch 61 starts lowering. Though not preferable, temporary pressurization may be performed after the lower center punch 61 has started lowering.

In the case where the effect that the packing density of the molding material forming the sidewall increases as well as the aforementioned "effect of leading an outer layer" is desired, the method comprising raising the lower outer punch 62 while lowering the lower center punch 61 to align their respective punch tips 61*d* and 62*d* with each other is most preferable. In this case, pre-compression is preferably performed continuously during the transition of the relative position of the lower center punch 61 and the lower outer punch 62 from the first position to the second position. That is, this method is such that the upper punch 5 continuously pressurizes the molding and the molding material on the lower punch 6 during the operation of lowering the lower center punch 61 and raising the lower outer punch 62 for aligning both punch tips 61*d* and 62*d* until the relative position of the lower center punch 61 and the lower outer punch 62 assumes the second position.

The pre-compression method, which is employed when the aforementioned "effect of leading an outer layer" is desired, is applicable not only to the embodiment provided with two molding material feeding and filling sections but also to the embodiment provided with three molding material feeding and filling sections. In the latter case, an improvement can be made with respect to ring-shaped contamination by the second molding material, which is possible to occur at a portion of the molding contacting the inner periphery of the lower outer punch tip.

Besides the foregoing embodiments, the present invention can be embodied to prepare a molding that is different from the above-described molding with core by the use of the double-structured punch and the rotary compression molding machine according to the present invention. For example, a molding of the type having a core fitted in, which allows the core to be recognized from one side of the molding, can be easily prepared by the use of the rotary compression molding machine of the aforementioned type provided with two molding material feeding and filling sections by avoiding the "effect of leading an outer layer". Even when the rotary compression molding machine of the type provided with three molding material feeding and filling sections is used, such a molding of the type having a core fitted in can be easily prepared if the molding material is not supplied to the first molding material feeding and filling section PSD1, or the second molding material PD2 which will form the core is supplied to this feeding and filling section.

If the rotary compression molding machine of the present invention is provided with additional first molding material feeding and filling section PSD1 and their associated guide rail and compression roll, a multi-core molding having plural cores or outer layers, the number of which corresponds to the number of additional feeding and filling sections, can be prepared (see International Laid-Open Publication No. WO 01/98067 pamphlet FIG. 2).

In the above-described embodiment, the lower outer punch 62, in particular, may have punch tip 62*d* having an inner peripheral wall comprising a tapered inner peripheral surface 62*db* which widens as it extends toward the punch tip. This tapered inner peripheral surface 62*db* is structured to have continuously increasing inner diameter as it extends from a predetermined location on the inner peripheral wall of the lower outer punch tip 62*d* toward the tip end. Such a structure makes it possible to lessen friction between the inner peripheral surface of the tip end portion of the lower outer punch 62 and the provisional molding consisting of the first molding material PD1 and the second molding material PD2 which occurs when the provisional molding on the lower center punch tip 61*d* is pressed up into the die bore 4*a*, thereby preventing the provisional molding from being shaved, hence, preventing the aimed molding with core from being soiled at its bottom due to contamination by such molding material thus shaved off.

In this case, the lower punch may be the double-structured punch of the present invention or a double-structured punch of the lower punch type described in International Laid-Open Publication No. WO 02/090098 pamphlet. Some types of moldings to be prepared allow an ordinary punch to be used. The rotary compression molding machine according to the present invention is basically similar in structure to that described in International Laid-Open Publication No. WO 02/090098 pamphlet or that described in International Laid-Open Publication No. WO 03/018302 pamphlet, but is essentially different therefrom in having the above-described relative position restricting means in the double-structured punch and the guide means enabling the relative position restricting means to restrict the relative position of the center punch and the lower punch. The guide means includes, for example, the restricting component guide rails 31*a* and 33*a* for guiding rotation of the restricting components forming the relative position restricting means.

Figure 12:
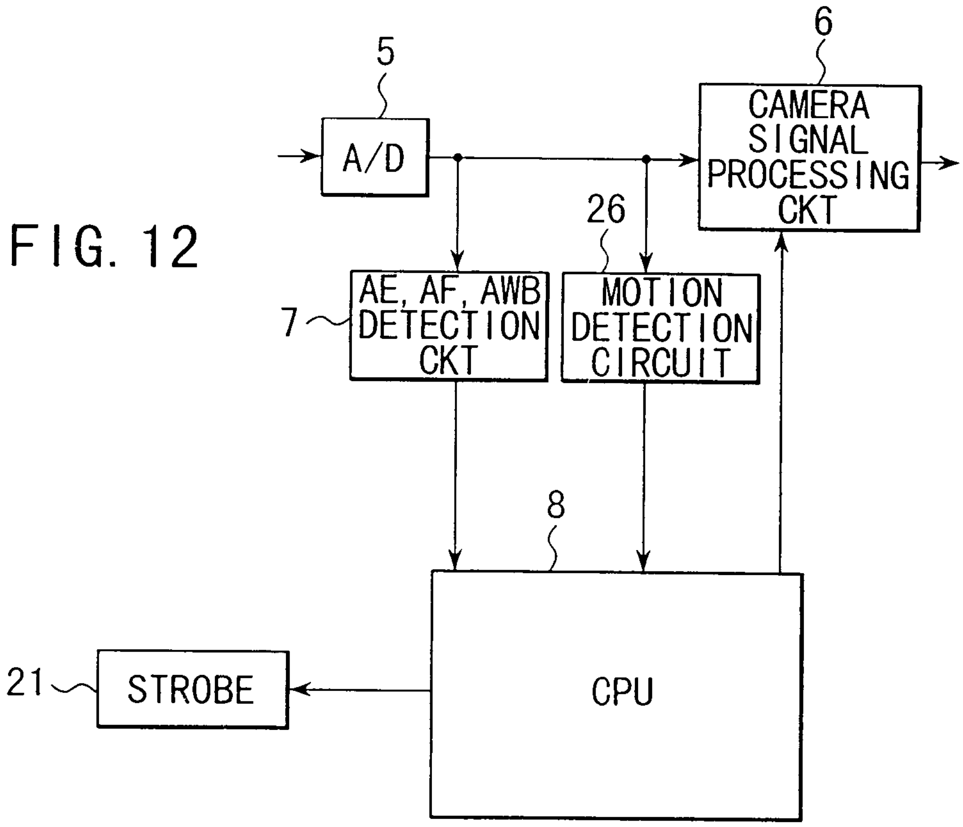
FIG. 12 is a perspective view showing variations of first and second restricting components.

The first and second restricting components may be shaped as shown in FIG. 12 other than described in the foregoing embodiment. Specifically, a first restricting component 151*c* has radially projected portions 151*ca* and radially depressed portions 151*cb*, which are formed internally of an annular component, as shown in FIG. 12(*a*). The rotation control means is not illustrated in this FIGURE. The rotation control means may be the same as the foregoing embodiment. A second restricting component 152*c*, which is the counterpart of the first restricting component 151*c*, has radially projected portions 152*ca* and radially depressed portions 152*cb*, which are formed along the outer periphery of an annular component.

Alternatively, a first restricting component 251*c* has depressed portions 251*cb* formed as circular holes on the surface toward the central axis of the annular component at a predetermined pitch along the periphery of the annular component, and projected portions 251*ca* formed as a portion lying between the depressed portions 251*cb*, as shown in FIG. 12(*b*). The rotation control means is not illustrated in this FIGURE because the rotation control means may be the same as the foregoing embodiment. A second restricting component 252*c*, which is the counterpart of this embodiment of the first restricting component 251*c*, has projected portions 252*ca* formed as a column protruding in the same direction of the central axis on the surface toward the central axis of an annular component, and depressed portions 252*cb* formed as a portion lying between the projected portions 252*ca*. In this case, the projected portions 252*ca* are formed at a pitch equal to the pitch at which the depressed portions 252*cb* of the first restricting component 251*c* are formed.

The first and second restricting components are not limited to those shown in FIGURES in regard to the shapes and the numbers of the projected portions and the depressed portions as long as the projected portions and the depressed portions function in pairs. Examples of each shape of the projected portions and the depressed portions include a circular cylinder, triangular prism, quadratic prism, prism, cone, triangular pyramid, quadrangular pyramid, pyramid, and like shapes, or combinations thereof. Any one of such shapes may be selected as long as sliding of the first and second restricting components and pressure transmission during projected portions-projected portions contact or projected portions-depressed portions contact are allowed to proceed smoothly.

Similarly, there is no particular limitation on the number of projected portions or depressed portions of each restricting component as long as projected portions-projected portions contact and projected portions-depressed portions contact are possible. However, if the number of projected portions and the number of depressed portions are extremely large, failures, such as damage to the projected portions and/or the depressed portions, might occur in changing the contact position between the projected portions and the depressed portions or in transmitting pressure during contact between the projected portions and the depressed portions, because the projected portions and the depressed portions become so thin or narrow in shape. If the number of projected portions and the number of depressed portions are extremely small, for example, one and one, respectively, it is possible that non-uniform pressure transmission to the axis of the center punch is performed in pressure transmission during contact between the projected portions and the depressed portions and the like. For this reason, it is preferable to provide plural projected portions and plural depressed portions in view of the diameter of the trunk portion of the double-structured punch and the sizes of the projected portions and the depressed portions.

The projected portions and the depressed portions of the first and second restricting components are arranged annularly as opposed to each other along the respective trunk surfaces of the punches. The expression "annular", as used in the present DESCRIPTION, should be construed to include all annular configurations which can extend along the trunk surface. Accordingly, such annular configurations are not necessarily limited to circularly or polygonally annular configurations but include a part of an annular configuration and combinations of the aforementioned configurations. Nevertheless, the projected portions and the depressed portions are preferably arranged in circularly annular configurations along the trunk surfaces of the respective punches in view of downsizing of the punch and convenience of handling and the like.

Figure 13:
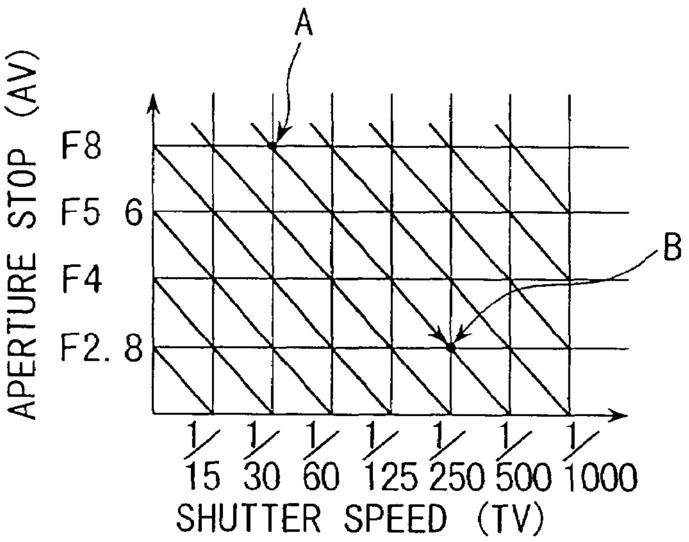
FIG. 13 is a perspective view showing a variation of the rotation control means.

It is explained that the plate component 51*cc* shaped like a bell in a plane view is used as the rotation control means in the foregoing embodiment. Such shapes include not only a bell shape but also a triangle-like shape such as a triangular shape, trapezoidal shape, and a partially cut-out circular shape and the like. For example, a plate component 151*cc* shaped substantially elliptical in a plane view as shown in FIG. 13 has protuberant portions 151*ccx* and 151*ccy* for producing rotational force on the restricting component or controlling rotation by frictional force produced as they slide on respective of the inner wall surface and outer wall surface of the restricting component guide rail, and other peripheral surface 151*cz*, on the outer periphery thereof at locations corresponding to the center of the major axis. Any plate component having such shapes may be employed.

Figure 14:
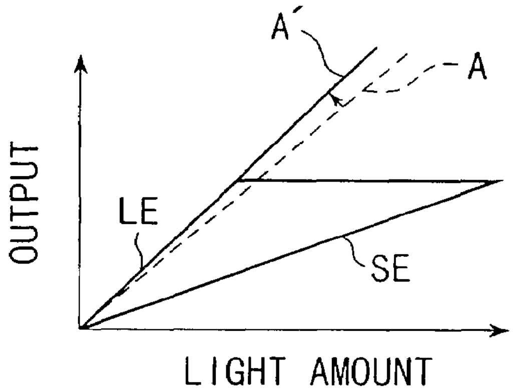
FIG. 14 shows other embodiments of the rotation control means and the rotation drive means, including: embodiment (a) configured such that a projection formed on a restricting component is brought into contact with an external projection serving as the rotation drive means to cause the restricting component to rotate; embodiment (b) configured such that a gear provided on a restricting component is meshed with teeth of the rotation drive means to cause the restricting component to rotate; embodiment (c) configured such that a toothed arm meshing with a gear provided on a restricting component is reciprocated to cause the restricting component to rotate; embodiment (d) configured such that a friction component provided on a restricting component is brought into frictional contact with the rotation drive means to cause the restricting component to rotate; and embodiment (e) configured such that repulsion or attraction force produced between a magnet provided on a restricting component and a magnet of the rotation drive means causes the restricting component to rotate.

Besides the rotation control means for controlling the aforementioned bell-shaped plate component by the use of the restricting component guide rail serving as the rotation drive means, rotation control means of various types as shown in FIG. 14 may be employed. In FIG. 14, arrow a indicates the direction of rotation of a non-illustrated turret and arrow β indicates the direction of rotation of the rotation control means. In addition, the rotation control means is integral with the restricting component. For example, an arrangement shown in FIG. 14(*a*) in which first restricting component 351*c* has one or more projections 351*cp* serving as the rotation control means is configured to bring the projection 351*cp* at a predetermined location into contact with an external projection 331*a* serving as the rotation drive means, thereby exerting an external force on the first restricting component for rotation control.

An arrangement shown in FIG. 14(*b*) in which first restricting component 451*c* is provided on its outer periphery with teeth 451*ct* serving as the rotation control means is configured to bring the teeth 451*ct* into direct contact with an internal gear structure 431*a* having teeth 431*aa* at predetermined regularity which is equivalent to aforementioned restricting component guide rail 31*a* and serves as the rotation drive means, thereby controlling rotation of the first restricting component 451*c*.

An arrangement shown in FIG. 14(*c*) is configured to rotate the aforementioned first restricting component 451*c* by a rack-and-pinion structure, using a toothed arm 531*ab* interlocked with a cam (not shown) sliding within a groove 531*a*. In this arrangement, the groove 531*a* and the toothed arm 531*ab* form the rotation drive means.

An arrangement shown in FIG. 14(*d*) in which first restricting component 651*c* is provided with a friction component 651*cf* serving as the rotation control means, restricting component guide rail 631*a* is provided with a friction component 631*af* and both friction components are formed from rubber or a like material, is configured to bring the friction component 651*cf* into contact with the friction component 631*af* at a predetermined location, thereby controlling rotation of the first restricting component 651*c*.

An arrangement shown in FIG. 14(*e*) in which a magnet (permanent magnet or electromagnet) 731*am* serving as the rotation drive means is provided on restricting component guide rail 731*a* at a predetermined location and a magnet 751*cm* serving as the rotation control means is provided on first restricting component 751*c*, is configured to control rotation of the first restricting component 751*c* by utilizing magnetic repulsion force or magnetic attraction force produced between the magnets 731*am* and 751*cm*. Any arrangement which can control rotation of the first restricting component may be employed. There is no particular limitation on the material for use therein.

While the present invention has been described in detail, the present invention is not limited to the foregoing embodiments described above. And the construction of each part is not limited to the illustrated examples but may be variously modified without departing from the concept of the present invention.

The invention claimed is:

1. A punch comprising: a center punch and an outer punch surrounding the outer periphery of the center punch, both of the center punch and the outer punch being slidable and capable of compressing operation; and relative position restriction means for restricting a relative position of the center punch and the outer punch, the relative position restriction means being configured to restrict a first position in which the punch tip of the center punch is protruded from the punch tip of the outer punch and a second position in which the punch tip of the center punch is substantially coincident with the punch tip of the outer punch, and being configured to fail to restrict a third position in which the punch tip of the center punch is retracted in the punch tip of the outer punch, wherein the relative position restriction means comprises a first restricting component provided on the center punch and a second restricting component provided on the outer punch; both of the first restricting component and the second restricting component are shaped annular and comprising a projected-depressed portion having a projected portion and a depressed portion; the first restricting component and the second restricting component are positioned with their respective projected-depressed portion facing each other: at least one of the first restricting component and the second restricting component is rotatable on a punch axis of the center punch; and as a result of its rotation, the projected portion of one of the restricting components and the depressed portion of the other restricting component are positioned to be allowed to come close to each other or the projected portions of both restricting components are positioned to be allowed to come into contact with each other.

2. The punch according to claim 1, wherein the first restricting component has a structure capable of rotating on the punch axis of the center punch, while the second restricting component has a structure incapable of rotating on the punch axis of the center punch.

3. The punch according to claim 1, wherein the first restricting component is located adjacent to a head portion of the center punch on an opposite side away from the punch tip of the center punch, while the second restricting component is located adjacent to an end portion of the outer punch on an opposite side away from the punch tip of the outer punch.

4. The punch according to claim 1, wherein rotation control means which controls rotation of the rotatable one of the first restricting component and the second restricting component by being guided by external rotation drive means is attached to the rotatable one of the restricting components.

5. The punch according to claim 4, wherein the rotation control means comprises a plate component shaped like a bell in a plane view.

6. The punch according to claim 1, wherein the relative position of the center punch and the outer punch assumes the first position when the projected portion of one of the first restricting component and the second restricting component and the depressed portion of the other restricting component come close to each other, and assumes the second position when the projected portions of the first restricting component and the second restricting component come into contact with each other.

7. The punch according to claim 1, wherein the outer punch has a punch tip having a tapered inner peripheral surface which widens as it extends toward a punch tip of the outer punch.

8. A rotary compression molding machine comprising: a turret being rotatably mounted in a frame; dies each having a die bore mounted in the turret at a predetermined pitch; an upper punch and a lower punch vertically slidably held above and below each of the dies, the upper punch and the lower punch comprising a center punch and an outer punch surrounding the outer periphery of the center punch, both of which being slidable and capable of compressing operation; a plurality of molding material feeding and filling sections each configured to feed molding material into the die or a space defined above the lower center punch and surrounded by the lower outer punch; pre-compression means configured to press the upper center punch and the lower center punch for compression-molding the molding material fed and filled in the space defined above the lower center punch and surrounded by the lower outer punch; and main compression means configured to press the upper punch and the lower punch for compression-molding the whole molding including the molding material fed and filled by a last molding material feeding and filling section, wherein at least the upper punch has relative position restriction means for restricting a relative position of the center punch and the outer punch, the relative position restriction means being configured to restrict a first position in which the punch tip of the center punch is protruded from the punch tip of the outer punch and a second position in which the punch tip of the center punch is substantially coincident with the punch tip of the outer punch, and being configured to fail to restrict a third position in which the punch tip of the center punch is retracted in the punch tip of the outer punch, wherein the relative position restriction means comprises a first restricting component provided on the center punch and a second restricting component provided on the outer punch; both of the first restricting component and the second restricting component are shaped annular and comprise a projected-depressed portion having a projected portion and a depressed portion; the first restricting component and the second restricting component are positioned with their respective projected-depressed portions facing each other; at least one of the first restricting component and second restricting component is rotatable on a punch axis of the center punch; and as a result of its rotation, the projected portion of one of the restricting components and the depressed portion of the other restricting component are positioned to be allowed to come close to each other or the projected portions of both restricting components are positioned to be allowed to come into contact with each other.

9. The rotary compression molding machine according to claim 8, wherein the lower punch has relative position restriction means similar to that of the upper punch.

10. The rotary compression molding machine according to claim 8, wherein the first restricting component has a structure capable of rotating on the punch axis of the center punch, while the second restricting component has a structure incapable of rotating on the punch axis of the center punch.

11. The rotary compression molding machine according to claim 8, wherein the first restricting component is located adjacent to a head portion of the center punch on an opposite side away from the punch tip of the center punch, while the second restricting component is located adjacent to an end portion of the outer punch on an opposite side away from the punch tip of the outer punch.

12. The rotary compression molding machine according to claim 8, wherein rotation control means which controls rotation of the rotatable one of the first restricting component and the second restricting component is attached to the rotatable restricting component and rotation drive means is configured to guide the rotation control means.

13. The rotary compression molding machine according to claim 12, wherein the rotation control means comprises a plate component shaped like a bell in a plane view and the rotation drive means is configured to control the rotation of the rotation control means by varying the width of a rail by which the rotation drive means guide the rotation control means and the distance between an inner wall surface of the rail and a horizontal trajectory of a central axis of the punch.

14. The rotary compression molding machine according to claim 8, wherein the relative position of the center punch and the outer punch assumes the first position when the projected portion of one of the first restricting component and the second restricting component and the depressed portion of the other restricting component come close to each other, and assumes the second position when the projected portions of the first restricting component and the second restricting component come into contact with each other.

15. The rotary compression molding machine according to claim 9, wherein the relative position of the lower center punch and the lower outer punch assumes the first position in the last molding material feeding and filling section after compression of the molding material by the pre-compression means, and then assumes the second position during compression of the whole molding including the molding material fed and filled by the main compression means.

16. The rotary compression molding machine according to claim 15, wherein additional pre-compression means is configured to compress the molding material while the relative position of the lower center punch and the lower outer punch shifts from the first position to the second position.

17. The rotary compression molding machine according to claim 9, wherein the molding material feeding and filling sections consist of a first molding material feeding and filling section for feeding first molding material, and a second molding material feeding and filling section for feeding second molding material; and the pre-compression means is configured to compress the first molding material.

18. The rotary compression molding machine according to claim 17, wherein additional pre-compression means is configured to compress the second molding material by the upper center punch and the upper outer punch.

19. The rotary compression molding machine according to claim 9, wherein the molding material feeding and filling sections consist of a first molding material feeding and filling section for feeding first molding material, a second molding material feeding and filling section for feeding second molding material, and a third molding material feeding and filling section for feeding third molding material, and wherein the pre-compression means consist of first pre-compression means for compressing the first molding material and second pre-compression means for compressing the second molding material.

* * * * *

UNITED STATES PATENT AND TRADEMARK OFFICE
CERTIFICATE OF CORRECTION

PATENT NO. : 7,581,941 B2
APPLICATION NO. : 11/660325
DATED : September 1, 2009
INVENTOR(S) : Kenji Harada et al.

It is certified that error appears in the above-identified patent and that said Letters Patent is hereby corrected as shown below:

Delete the Title page showing an illustrative figure and substitute therefor the attached Title page showing an illustrative figure.

Delete drawing sheets 1-8 and substitute therefor the attached drawings Sheets 1-16.

Signed and Sealed this

Eighth Day of December, 2009

David J. Kappos
*Director of the United States Patent and Trademark Office*

(12) United States Patent
Harada et al.

(10) Patent No.: US 7,581,941 B2
(45) Date of Patent: Sep. 1, 2009

(54) PUNCH, AND ROTARY COMPRESSION MOLDING MACHINE USING THE SAME

(75) Inventors: Kenji Harada, Kyoto (JP); Fumiharu Ikai, Shiga (JP); Yuichi Ozeki, Aichi (JP)

(73) Assignees: Kikusui Seisakusho Ltd., Kyoto (JP); Sanwa Kagaku Kenkyusho Co., Ltd., Aichi (JP)

( * ) Notice: Subject to any disclaimer, the term of this patent is extended or adjusted under 35 U.S.C. 154(b) by 248 days.

(21) Appl. No.: 11/660,325

(22) PCT Filed: Aug. 24, 2005

(86) PCT No.: PCT/JP2005/015339

§ 371 (c)(1), (2), (4) Date: Feb. 15, 2007

(87) PCT Pub. No.: WO2006/022290

PCT Pub. Date: Mar. 2, 2006

(65) Prior Publication Data

US 2008/0092706 A1 Apr. 24, 2008

(30) Foreign Application Priority Data

Aug. 26, 2004 (JP) ............................. 2004-246734

(51) Int. Cl.
*B29C 43/08* (2006.01)

(52) U.S. Cl. ..................... 425/345; 425/353; 425/405.1

(58) Field of Classification Search ................... 425/78, 425/344–345, 352–354, 450.1, 451.9
See application file for complete search history.

(56) References Cited

U.S. PATENT DOCUMENTS

| | | | | |
|---|---|---|---|---|
| 7,056,111 | B2 * | 6/2006 | Kitamura et al. | 425/345 |
| 2004/0113319 | A1 | 6/2004 | Kondo et al. | |
| 2004/0131717 | A1 | 7/2004 | Shimada et al. | |

FOREIGN PATENT DOCUMENTS

| | | | |
|---|---|---|---|
| WO | WO 01/98067 | A1 | 12/2001 |
| WO | WO 02/090098 | A1 | 11/2002 |
| WO | WO 03/018302 | A1 | 3/2003 |

OTHER PUBLICATIONS

International Search Report of PCT/JP2005/015339, date of mailing Nov. 29, 2005.

* cited by examiner

*Primary Examiner*—Yogendra Gupta
*Assistant Examiner*—Thu khanh T Nguyen
(74) *Attorney, Agent, or Firm*—Westerman, Hattori, Daniels & Adrian, LLP.

(57) ABSTRACT

This invention provides a punch comprising: a center punch and an outer punch surrounding the outer periphery of the center punch, both of which being slidable and capable of compressing; and relative position restriction means for restricting a relative position of the center and outer punches, the relative position restriction means being configured to restrict a first position in which a punch tip of the center punch is protruded from a punch tip of the outer punch and a second position in which the punch tip of the center punch is substantially coincident with the punch tip of the outer punch, and being configured to fail to restrict a third position in which the punch tip of the center punch is retracted in the punch tip of the outer punch, as well as a rotary compression molding machine provided with the double-structured punch.

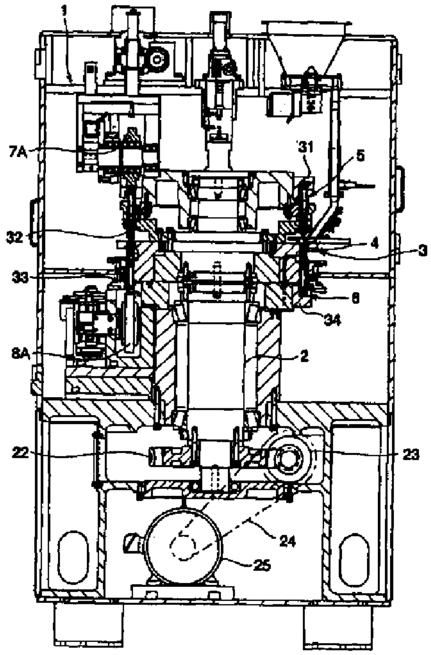

19 Claims, 16 Drawing Sheets